US010758786B2

(12) United States Patent
Watanabe et al.

(10) Patent No.: US 10,758,786 B2
(45) Date of Patent: Sep. 1, 2020

(54) MULTI-PIECE SOLID GOLF BALL

(71) Applicant: Bridgestone Sports Co., Ltd., Tokyo (JP)

(72) Inventors: Hideo Watanabe, Chichibushi (JP); Akira Kimura, Chichibushi (JP); Masanobu Kuwahara, Chichibushi (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 0 days.

(21) Appl. No.: 16/173,733

(22) Filed: Oct. 29, 2018

(65) Prior Publication Data

US 2019/0134466 A1 May 9, 2019

(30) Foreign Application Priority Data

Nov. 9, 2017 (JP) ................. 2017-216445

(51) Int. Cl.
*A63B 37/06* (2006.01)
*A63B 37/00* (2006.01)
*B32B 1/00* (2006.01)
*B32B 3/30* (2006.01)
*B32B 27/08* (2006.01)
*B32B 27/40* (2006.01)

(52) U.S. Cl.
CPC ...... *A63B 37/0076* (2013.01); *A63B 37/0012* (2013.01); *A63B 37/0018* (2013.01); *A63B 37/0019* (2013.01); *A63B 37/0063* (2013.01); *A63B 37/0064* (2013.01); *A63B 37/0065* (2013.01); *A63B 37/0068* (2013.01); *A63B 37/0084* (2013.01); *A63B 37/0096* (2013.01); *B32B 1/00* (2013.01); *B32B 3/30* (2013.01); *B32B 27/08* (2013.01); *B32B 27/40* (2013.01); *B32B 2307/536* (2013.01)

(58) Field of Classification Search
CPC .................. A63B 37/0063; A63B 37/0044
USPC ....................................... 473/376
See application file for complete search history.

(56) References Cited

U.S. PATENT DOCUMENTS

| 6,248,029 | B1 | 6/2001 | Maruko |
| 7,160,208 | B2 | 1/2007 | Watanabe |
| 7,367,901 | B2 | 5/2008 | Watanabe et al. |
| 7,625,302 | B2 | 12/2009 | Watanabe et al. |
| 7,951,016 | B2 | 5/2011 | Yamagishi et al. |

(Continued)

FOREIGN PATENT DOCUMENTS

| JP | 8-336617 A | 12/1996 |
| JP | 11-151320 A | 6/1999 |

(Continued)

*Primary Examiner* — Raeann Gorden
(74) *Attorney, Agent, or Firm* — Sughrue Mion, PLLC (57) ABSTRACT

In a golf ball having a two-layer core consisting of an inner core layer and an outer core layer, one or more intermediate layer, and a cover serving as an outermost layer, the inner core layer and outer core layer are each formed primarily of a base rubber, the inner core layer has a diameter of at least 21 mm, the intermediate layer and the cover are each formed primarily of a resin material, and the overall core has a specific hardness profile. The golf ball has a high initial velocity while holding down the spin rate on full shots with a driver or long iron, thus enabling a good distance to be achieved. The ball also has a high controllability in the short game.

22 Claims, 2 Drawing Sheets

(56) References Cited

U.S. PATENT DOCUMENTS

| | | | |
|---|---|---|---|
| 8,021,248 B2 * | 9/2011 | Sullivan | A63B 37/0044 473/373 |
| 8,597,140 B2 | 12/2013 | Komatsu et al. | |
| 8,882,610 B2 | 11/2014 | Matsuyama et al. | |
| 8,951,148 B2 | 2/2015 | Matsuyama | |
| 9,144,713 B2 | 9/2015 | Sajima et al. | |
| 9,908,007 B2 | 3/2018 | Watanabe et al. | |
| 9,968,829 B2 | 5/2018 | Watanabe et al. | |
| 9,993,691 B2 | 6/2018 | Watanabe et al. | |
| 2012/0129632 A1 * | 5/2012 | Sullivan | A63B 37/0031 473/376 |
| 2013/0172113 A1 | 7/2013 | Isogawa et al. | |

FOREIGN PATENT DOCUMENTS

| | | | |
|---|---|---|---|
| JP | 11-206920 A | 8/1999 | |
| JP | 2003-190331 A | 7/2003 | |
| JP | 2006-230661 A | 9/2006 | |
| JP | 2006-289065 A | 10/2006 | |
| JP | 2009-095358 A | 5/2009 | |
| JP | 2011-115593 A | 6/2011 | |
| JP | 2012-080923 A | 4/2012 | |
| JP | 2012-139337 A | 7/2012 | |
| JP | 2012-139401 A | 7/2012 | |
| JP | 2012-223286 A | 11/2012 | |
| JP | 2013-150770 A | 8/2013 | |
| JP | 2013-150771 A | 8/2013 | |
| JP | 2016-101256 A | 6/2016 | |
| JP | 2017-046930 A | 3/2017 | |
| JP | 2017-086579 A | 5/2017 | |

* cited by examiner

MULTI-PIECE SOLID GOLF BALL

CROSS-REFERENCE TO RELATED APPLICATION

This non-provisional application claims priority under 35 U.S.C. § 119(a) on Patent Application No. 2017-216445 filed in Japan on Nov. 9, 2017, the entire contents of which are hereby incorporated by reference.

TECHNICAL FIELD

The present invention relates to a multi-piece solid golf ball having a core, an intermediate layer and a cover. More specifically, the invention relates to a multi-piece solid golf ball having a construction of four or more layers in which the core is a two-layer core consisting of a rubber inner core layer that is soft and a rubber outer layer that is harder than the inner layer, the intermediate layer is relatively hard, and the cover is formed primarily of a resin material such as a urethane resin.

BACKGROUND ART

Key performance features required in golf balls include distance, controllability, durability and feel at impact. Balls endowed with these qualities in the highest degree are constantly being sought. A succession of golf balls having multi-piece constructions typically composed of three layers have emerged in recent years. By having the golf ball construction be multilayered, it is possible to combine numerous materials of differing properties, enabling a wide variety of ball designs in which each layer has a particular function to be obtained.

Of these, functional multi-piece solid golf balls having an optimized hardness relationship among the layers encasing the core, such as an intermediate layer and a cover (outermost layer), are widely used. For example, golf balls which have three or more layers, including at least a core, an intermediate layer and a cover, and which are focused on design attributes such as the core diameter, the intermediate layer and cover thicknesses, the deflection of the core under specific loading and the hardnesses of the respective layers, are disclosed in the following patent publications: JP-A H11-151320, JP-A 2003-190331, JP-A 2006-289065, JP-A 2011-115593, JP-A H8-336617, JP-A 2006-230661, JP-A 2017-46930, JP-A 2017-86579, JP-A 2009-95358, JP-A 2016-101256, JP-A 2013-150770, JP-A 2013-150771, JP-A 2012-139337, JP-A 2012-80923, JP-A 2012-139401, JP-A 2012-223286 and JP-A H11-206920.

In the golf balls of JP-A H11-151320, JP-A 2003-190331, JP-A 2006-289065, JP-A 2011-115593, JP-A H8-336617, JP-A 2006-230661, JP-A 2017-46930, JP-A 2017-86579, JP-A 2009-95358 and JP-A 2016-101256, the core is formed as a two-layer core, but these two-layer cores lack optimized hardness profiles, leaving room for improvement. In the golf balls of JP-A 2013-150770, JP-A 2013-150771, JP-A 2012-139337, JP-A 2012-80923, JP-A 2012-139401 and JP-A 2012-223286, the core is formed as a two-layer core, but the inner core layer in these two-layer cores has a small diameter. The golf ball of JP-A H11-206920 is a three-piece solid golf ball in which a two-layer core is encased by one cover layer; that is, the cover consists of a single layer. From the standpoint of achieving a greater flight performance and imparting higher controllability on approach shots, there remains room for improvement in the construction of these prior-art golf balls.

SUMMARY OF THE INVENTION

It is therefore an object of the present invention to provide a golf ball which can achieve a good distance on shots with a driver (W #1) and which has a high controllability in the short game.

As a result of extensive investigations, we have discovered that, in a multi-piece solid golf ball having a two-layer core consisting of an inner core layer and an outer core layer, one or more intermediate layer, and a cover as the outermost layer, specific desirable effects can be attained by forming the inner core layer and the outer core layer each chiefly of a base rubber, by specifying the diameter of the inner core layer, by forming the intermediate layer and the cover each primarily of resin materials, and moreover by optimizing the relationship among, in the hardness profile of the overall core consisting of the above two core layers, the center hardness of the inner core layer, the hardness at a position 10 mm from the center of the inner core layer, the surface hardness of the outer core layer and the hardness at a position 5 mm inside the surface of the outer core layer. Specifically, an increased distance on shots with a driver (W #1) and a desired distance on shots with an iron can be achieved, in addition to which the controllability on approach shots in the short game is good.

That is, the multi-piece solid golf ball of the invention, as a golf ball primarily for professionals and other skilled golfers, has a construction of four or more layers that includes a soft inner core layer and a somewhat harder outer core layer, an intermediate layer made of a hard resin material, and a cover made of a resin such as polyurethane. This construction holds down the spin of the ball on full shots and gives the ball a high initial velocity when struck, resulting in a good distance. Moreover, a soft resin material such as urethane can be suitably used in the cover to increase the controllability of the ball in the short game. In addition, the hardness profile of the core and the diameter of the inner core layer are specified in this invention in order to successfully achieve both a lower spin rate and a high initial velocity.

Accordingly, the invention provides a multi-piece solid golf ball having a two-layer core consisting of an inner core layer and an outer core layer, one or more intermediate layer, and a cover serving as an outermost layer, wherein the inner core layer and the outer core layer are each formed primarily of a base rubber, the inner core layer has a diameter of at least 21 mm, the intermediate layer and the cover are each formed primarily of a resin material, and the overall core consisting of the two core layers has a hardness profile that, letting Cc be the JIS-C hardness at a center of the inner core layer, C10 be the JIS-C hardness at a position 10 mm from the center of the inner core layer, Css be the JIS-C hardness at a surface of the outer core layer, and Css-5 be the JIS-C hardness at a position 5 mm inside the outer core layer surface, satisfies conditions (1) and (2) below:

$$\{(Css)-(Css\text{-}5)\}-\{(C10)-(Cc)\}>0, \text{ and} \quad (1)$$

$$(Css)-(Cc) \geq 27. \quad (2)$$

In a preferred embodiment of the golf ball of the invention, letting C5 be the JIS-C hardness at a position 5 mm from the center of the inner core layer, the hardness profile of the overall core further satisfies condition (3) below:

$$\{(Css)-(Css\text{-}5)\}-\{(C5)-(Cc)\} \geq 5. \quad (3)$$

In another preferred embodiment, the golf ball of the invention further satisfies condition (4) below:

cover thickness (mm)<intermediate layer thickness
  (mm)<outer core layer thickness (mm)<inner
  core layer diameter (mm). (4)

In yet another preferred embodiment, the golf ball further satisfies condition (5) below:

initial velocity of ball (m/s)<initial velocity of intermediate layer-encased sphere (m/s)>initial velocity of core (m/s). (5)

In still another preferred embodiment, the golf ball further satisfies condition (6) below:

(initial velocity of intermediate layer-encased sphere−initial velocity of ball)≥0.5 m/s. (6)

In a further preferred embodiment, the golf ball additionally satisfies condition (7) below:

(initial velocity of intermediate layer-encased sphere−initial velocity of core)≥0.3 m/s. (7)

In a yet further preferred embodiment, the golf ball further satisfies condition (8) below:

−0.2≤(initial velocity of core−initial velocity of ball) ≤0.5 m/s. (8)

In a still further preferred embodiment of the inventive golf ball, letting E be the deflection (mm) of the inner core layer when compressed under a final load of 1,275 N (130 kgf) from an initial load of 98 N (10 kgf) and C be the deflection (mm) of the overall core when compressed under a final load of 1,275 N (130 kgf) from an initial load of 98 N (10 kgf), the ball satisfies condition (9) below:

0.50≤C/E≤0.75. (9)

In yet another preferred embodiment of the golf ball of the invention, the outermost layer (cover) has numerous dimples formed on a surface thereof, the ball has arranged thereon at least one dimple with a cross-sectional shape that is described by a curved line or by a combination of a straight line and a curved line and is specified by steps (i) to (iv) below, and the total number of dimples is from 250 to 380:

(i) letting the foot of a perpendicular drawn from a deepest point of the dimple to an imaginary plane defined by a peripheral edge of the dimple be the dimple center and a straight line that passes through the dimple center and any one point on the edge of the dimple be the reference line;

(ii) dividing a segment of the reference line from the dimple edge to the dimple center into at least 100 points and computing the distance ratio for each point when the distance from the dimple edge to the dimple center is set to 100%;

(iii) computing the dimple depth ratio at every 20% from 0 to 100% of the distance from the dimple edge to the dimple center; and (iv) at the depth ratios in dimple regions 20 to 100% of the distance from the dimple edge to the dimple center, determining the change in depth ΔH every 20% of said distance and designing a dimple cross-sectional shape such that the change ΔH is at least 6% and not more than 24% in all regions corresponding to from 20 to 100% of said distance.

Advantageous Effects of the Invention

On full shots with a driver (W #1) or a long iron, the multi-piece solid golf ball of the invention can achieve a high initial velocity while holding down the spin rate, enabling a good distance to be obtained. Moreover, this golf ball has a high controllability in the short game, making it ideal as a golf ball for professional and skilled amateur golfers.

BRIEF DESCRIPTION OF THE DIAGRAMS

FIG. 2 presents schematic cross-sectional views of dimples used in the Working Examples and Comparative Examples, FIG. 2A showing a dimple having a distinctive cross-sectional shape, and FIG. 2B showing a dimple having a circularly arcuate cross-sectional shape.

DESCRIPTION OF THE PREFERRED EMBODIMENTS

The objects, features and advantages of the invention will become more apparent from the following detailed description taken in conjunction with the appended diagrams.

Figure 1:
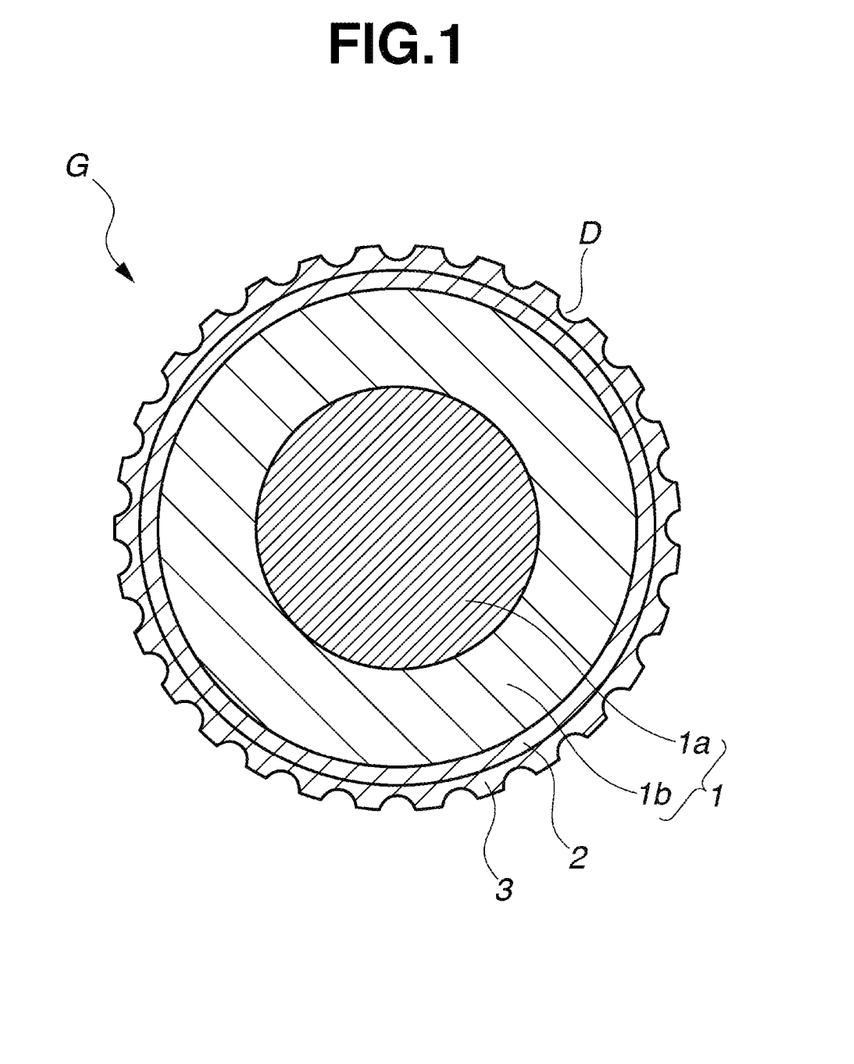
FIG. 1 is a schematic cross-sectional view of a multi-piece solid golf ball according to one embodiment of the invention.

The multi-piece solid golf ball of the invention has a core, an intermediate layer and a cover. Referring to FIG. 1, which shows an embodiment of the inventive golf ball, the ball G has a core 1, an intermediate layer 2 encasing the core 1, and a cover 3 encasing the intermediate layer 2. The cover 3, excluding a paint film layer, is positioned as the outermost layer in the layered structure of the golf ball. In this invention, the core 1 is formed of two layers: an inner core layer 1a and an outer core layer 1b. The intermediate layer may be a single layer or may be formed as two or more layers. Numerous dimples D are typically formed on the surface of the cover (outermost layer) 3 so as to enhance the aerodynamic properties of the ball. Each layer is described in detail below.

The core in this invention is formed into two layers: an inner core layer and an outer core layer.

The inner core layer has a diameter of preferably at least 21 mm, more preferably at least 22 mm, and even more preferably at least 23 mm. The upper limit is preferably not more than 30 mm, and more preferably not more than 25 mm. When the inner core layer diameter is too small, the initial velocity of the ball on full shots may decline and the spin rate-lowering effect may be inadequate, as a result of which the intended distance may not be achieved. When the inner core layer diameter is too large, the durability to cracking on repeated impact may worsen or the spin rate-lowering effect on full shots may be inadequate, as a result of which the intended distance may not be achieved.

The outer core layer is the layer that directly encases the inner core layer. This layer has a thickness of preferably at least 4 mm, more preferably at least 5 mm, and even more preferably at least 6 mm. The upper limit is preferably not more than 11 mm, more preferably not more than 10 mm, and even more preferably not more than 9 mm. When the outer core layer has a thickness that is too large, the initial velocity of the ball on full shots may decline, as a result of which the intended distance may not be achieved. When the outer core layer has a thickness that is too small, the durability to cracking on repeated impact may worsen, or the spin rate-lowering effect on full shots may be inadequate, as a result of which the intended distance may not be achieved.

The inner core layer and outer core layer materials are each composed primarily of a rubber material. The rubber material in the outer core layer encasing the inner core layer may be the same as or different from the rubber material in the inner core layer. Specifically, a rubber composition can be prepared using a base rubber as the chief component and including, together with this, other ingredients such as a co-crosslinking agent, an organic peroxide, an inert filler and an organosulfur compound. Polybutadiene is preferably used as the base rubber.

In the practice of the invention, the core structure of a relatively soft inner core layer and a relatively hard outer core layer enables a good distance and a good feel at impact to be obtained on full shots with clubs ranging from drivers to irons.

The co-crosslinking agent is exemplified by unsaturated carboxylic acids and metal salts of unsaturated carboxylic acids. Specific examples of unsaturated carboxylic acids include acrylic acid, methacrylic acid, maleic acid and fumaric acid, with the use of acrylic acid and methacrylic acid being especially preferred. The metal salts of unsaturated carboxylic acids, although not particularly limited, are exemplified by the above unsaturated carboxylic acids that have been neutralized with a desired metal ion. Specific examples include zinc salts and magnesium salts of methacrylic acid and acrylic acid. The use of zinc acrylate is especially preferred.

The unsaturated carboxylic acid and/or metal salt thereof is included in an amount, per 100 parts by weight of the base rubber, of typically at least 5 parts by weight, preferably at least 9 parts by weight, and more preferably at least 13 parts by weight, with the upper limit being typically not more than 60 parts by weight, preferably not more than 50 parts by weight, more preferably not more than 40 parts by weight, and most preferably not more than 30 parts by weight. When the content is too high, the ball may become too hard and have an unpleasant feel at impact. When the content is too low, the rebound may decrease.

A commercial product may be used as the organic peroxide. Examples of such products that may be suitably used include Percumyl D, Perhexa C-40 and Perhexa 3M (all products of NOF Corporation), and Luperco 231XL (from AtoChem Co.). These may be used singly or two or more may be used together. The amount of organic peroxide included per 100 parts by weight of the base rubber is preferably at least 0.1 part by weight, more preferably at least 0.3 part by weight, even more preferably at least 0.5 part by weight, and most preferably at least 0.6 part by weight. The upper limit is preferably not more than 5 parts by weight, more preferably not more than 4 parts by weight, even more preferably not more than 3 parts by weight, and most preferably not more than 2.5 parts by weight. When too much or too little is included, it may not be possible to obtain a ball having a good feel, durability and rebound.

Another compounding ingredient typically included with the base rubber is an inert filler, preferred examples of which include zinc oxide, barium sulfate and calcium carbonate. One of these may be used alone, or two or more may be used together. The amount of inert filler included per 100 parts by weight of the base rubber is preferably at least 1 part by weight, and more preferably at least 5 parts by weight. The upper limit is preferably not more than 50 parts by weight, more preferably not more than 40 parts by weight, and even more preferably not more than 35 parts by weight. Too much or too little inert filler may make it impossible to obtain a proper weight and a good rebound.

In addition, an antioxidant may be optionally included. Illustrative examples of suitable commercial antioxidants include Nocrac NS-6 and Nocrac NS-30 (both available from Ouchi Shinko Chemical Industry Co., Ltd.), and Yoshinox 425 (available from Yoshitomi Pharmaceutical Industries, Ltd.). One of these may be used alone, or two or more may be used together.

The amount of antioxidant included per 100 parts by weight of the base rubber can be set to 0 or more part by weight, preferably at least 0.05 part by weight, and more preferably at least 0.1 part by weight. The upper limit is preferably not more than 3 parts by weight, more preferably not more than 2 parts by weight, even more preferably not more than 1 part by weight, and most preferably not more than 0.5 part by weight. Too much or too little antioxidant may make it impossible to achieve a suitable ball rebound and durability.

An organosulfur compound is preferably included in the outer core layer in order to impart a good resilience. The organosulfur compound is not particularly limited, provided it can enhance the rebound of the golf ball. Exemplary organosulfur compounds include thiophenols, thionaphthols, halogenated thiophenols, and metal salts of these. Specific examples include pentachlorothiophenol, pentafluorothiophenol, pentabromothiophenol, p-chlorothiophenol, the zinc salt of pentachlorothiophenol, the zinc salt of pentafluorothiophenol, the zinc salt of pentabromothiophenol, the zinc salt of p-chlorothiophenol, and any of the following having 2 to 4 sulfur atoms: diphenylpolysulfides, dibenzylpolysulfides, dibenzoylpolysulfides, dibenzothiazoylpolysulfides and dithiobenzoylpolysulfides. The use of the zinc salt of pentachlorothiophenol is especially preferred.

It is recommended that the amount of organosulfur compound included per 100 parts by weight of the base rubber be more than 0 part by weight, preferably at least 0.05 part by weight, and more preferably at least 0.1 part by weight, and that the upper limit be preferably not more than 5 parts by weight, more preferably not more than 3 parts by weight, and even more preferably not more than 2.5 parts by weight. Including too much organosulfur compound may make a greater rebound-improving effect (particularly on shots with a W #1) unlikely to be obtained, may make the core too soft or may worsen the feel of the ball on impact. On the other hand, including too little may make a rebound-improving effect unlikely.

The methods for producing the inner core layer and the outer core layer are described. The inner core layer may be molded by a method in accordance with customary practice, such as that of forming the inner core layer material into a spherical shape under heating and compression at a temperature of at least 140° C. and not more than 180° C. for a period of at least 10 minutes and not more than 60 minutes. The method used to form the outer core layer on the surface of the inner core layer may involve forming a pair of half-cups from unvulcanized rubber in sheet form, placing the inner core layer within these cups so as to encapsulate it, and then molding under applied heat and pressure. For example, suitable use can be made of a process wherein, following initial vulcanization (semi-vulcanization) to produce a pair of hemispherical cups, the prefabricated inner core layer is placed in one of the hemispherical cups and then covered with the other hemispherical cup, in which state secondary vulcanization (complete vulcanization) is carried out. Alternatively, suitable use can be made of a process which divides vulcanization into two stages by rendering an unvulcanized rubber composition into sheet form so as to produce a pair of outer core layer-forming sheets, stamping the sheets using a die provided with a hemispherical protrusion to produce unvulcanized hemispherical cups, and subsequently covering a prefabricated inner core layer with a pair of these hemispherical cups and forming the whole into a spherical shape by heating and compression at between 140° C. and 180° C. for a period of from 10 to 60 minutes.

Next, it is preferable for the overall core consisting of the above two core layers to have a hardness profile in which the JIS-C hardness at the center of the inner core layer (Cc), the JIS-C hardness at a position 5 mm from the center of the inner core layer (C5), the JIS-C hardness at a position 10 mm from the center of the inner core layer (C10), the JIS-C hardness at the surface of the outer core layer (Css), and the JIS-C hardness at a position 5 mm inside the surface of the outer core layer (Css-5) are characterized as described below.

The hardness at the center of the inner core layer (Cc) is preferably at least 50, more preferably at least 52, and even more preferably at least 54. The upper limit is preferably not more than 62, more preferably not more than 60, and even more preferably not more than 57. When this value is too large, the spin rate of the ball may rise excessively, as a result of which a sufficient distance may not be obtained, or the feel at impact may be too hard. On the other hand, when this value is too small, the durability of the ball to cracking on repeated impact may worsen, or the feel at impact may become too soft.

The hardness at a position 5 mm from the center of the inner core layer (C5) is preferably at least 55, more preferably at least 58, and even more preferably at least 60. The upper limit is preferably not more than 70, more preferably not more than 67, and even more preferably not more than 65. The hardness at a position 10 mm from the center of the inner core layer (C10) is preferably at least 60, more preferably at least 62, and even more preferably at least 64. The upper limit is preferably not more than 74, more preferably not more than 72, and even more preferably not more than 70. When the hardness values at these positions are too large, the spin rate of the ball may rise excessively and a sufficient distance may not be achieved, or the feel of the ball may be too hard. On the other hand, when these values are too small, the durability of the ball to cracking on repeated impact may worsen, or the feel at impact may be too soft.

The hardness at the surface of the inner core layer (Cs) is preferably at least 60, more preferably at least 62, and even more preferably at least 64. The upper limit is preferably not more than 77, more preferably not more than 73, and even more preferably not more than 70. This surface hardness, expressed on the Shore D scale, is preferably at least 35, more preferably at least 38, and even more preferably at least 40. The upper limit is preferably not more than 50, more preferably not more than 48, and even more preferably not more than 45. When this value is too large, the durability to cracking on repeated impact may worsen. On the other hand, when this value is too small, the spin rate on full shots may increase, as a result of which the intended distance may not be obtained.

The value obtained by subtracting the hardness at the center of the inner core layer (Cc) from the hardness at a position 5 mm from the center of the inner core layer (C5) is preferably at least 1, more preferably at least 3, and even more preferably at least 5. The upper limit is preferably not more than 15, more preferably not more than 12, and even more preferably not more than 10.

The value obtained by subtracting the hardness at the center of the inner core layer (Cc) from the hardness at a position 10 mm from the center of the inner core layer (C10) is preferably at least 3, more preferably at least 6, and even more preferably at least 9. The upper limit is preferably not more than 18, more preferably not more than 15, and even more preferably not more than 13. When this value is too large, the initial velocity of the ball on full shots may be low, as a result of which the intended distance may not be achieved. On the other hand, when this value is too small, the spin rate on full shots may rise, as a result of which the intended distance may not be achieved.

The difference between the inner core layer surface hardness (Cs) and the inner core layer center hardness (Cc) is preferably at least 4, more preferably at least 6, and even more preferably at least 8. The upper limit is preferably not more than 16, more preferably not more than 14, and even more preferably not more than 12. When this difference is too large, the initial velocity of the ball on full shots becomes lower, as a result of which the intended distance may not be achieved, or the durability to cracking under repeated impact may worsen. On the other hand, when this difference is too small, the spin rate on full shots rises, as a result of which the intended distance may not be achieved.

The outer core layer has a surface hardness (Css) which is preferably at least 84, more preferably at least 86, and even more preferably at least 88. The upper limit is preferably not more than 97, more preferably not more than 95, and even more preferably not more than 93. This surface hardness, when expressed on the Shore D scale, is preferably at least 56, more preferably at least 58, and even more preferably at least 60. The upper limit is preferably not more than 66, more preferably not more than 64, and even more preferably not more than 62. When this value is too large, the feel at impact may harden or the durability to cracking on repeated impact may worsen. On the other hand, when this value is too small, the spin rate of the ball may rise excessively or the ball rebound may decrease, as a result of which a sufficient distance may not be achieved.

The hardness 5 mm inside the outer core layer surface (Css-5) is preferably at least 70, more preferably at least 72, and even more preferably at least 74. The upper limit is preferably not more than 83, more preferably not more than 80, and even more preferably not more than 78. When this value is too large, the feel at impact may become hard or the durability to cracking on repeated impact may worsen. When this value is too small, the spin rate of the ball may rise excessively or the rebound may become low, as a result of which a sufficient distance may not be achieved.

The value obtained by subtracting the hardness 5 mm inside the outer core layer surface (Css-5) from the outer core layer surface hardness (Css) is preferably at least 10, more preferably at least 12, and even more preferably at least 14. The upper limit is preferably not more than 18, more preferably not more than 17, and even more preferably not more than 15. When this value is too large, the durability to cracking on repeated impact may worsen. On the other hand, when this value is too small, the spin rate on full shots may rise, as a result of which a sufficient distance may not be achieved.

In the overall core that includes the inner and outer core layers, the difference between the surface hardness (Css) and the center hardness (Cc) is at least 27, preferably at least 30, and more preferably at least 32. The upper limit is preferably not more than 40, and more preferably not more than 37. When this hardness difference is too large, the durability to cracking under repeated impact may worsen. On the other hand, when this hardness difference is too small, the spin rate on full shots may rise, as a result of which a sufficient distance may not be achieved.

Letting the outer core layer surface hardness minus the hardness 5 mm inside the surface of the outer core layer (Css−Css-5) be A and the hardness at a position 5 mm from the center of the inner core layer minus the center hardness of the inner core layer (C5−Cc) be B, the value of A−B is preferably at least 5, more preferably at least 6, and even more preferably at least 7, but is preferably not more than 10, more preferably not more than 9, and even more preferably not more than 8. When A−B has a large value, this signifies that the core has a hardness gradient in the outside portion thereof that is larger than the hardness gradient in the center portion. By optimizing this value, the spin rate of the ball on full shots can be held down, enabling a good distance to be achieved.

Letting the hardness 10 mm from the center of the inner core layer minus the center hardness of the inner core layer (C10−Cc) be C, the value A−C must be larger than 0. The lower limit of this value is preferably at least 1, and more preferably at least 2. The upper limit is preferably not more than 6, and more preferably not more than 4.

In the intermediate layer, any of various types of thermoplastic resins, especially ionomer resins, used as cover materials in golf balls may be used here as the intermediate layer material. A commercial product may be used as the ionomer resin. Alternatively, the resin material used in the intermediate layer may be one obtained by blending, of commercial ionomer resins, a high-acid ionomer resin having an acid content of at least 16 wt % into an ordinary ionomer resin. This blend, by providing a high rebound and lowering the spin rate of the ball, enables a good distance to be obtained on shots with a driver (W #1). The amount of unsaturated carboxylic acid included in the high-acid ionomer resin (acid content) is typically at least 16 wt %, preferably at least 17 wt %, and more preferably at least 18 wt %. The upper limit is preferably not more than 22 wt %, more preferably not more than 21 wt %, and even more preferably not more than 20 wt %. When the acid content is too low, the spin rate may rise on full shots, as a result of which the intended distance may not be achieved. On the other hand, when this value is too large, the feel at impact may be too hard or the durability to cracking on repeated impact may worsen.

It is desirable to abrade the surface of the intermediate layer in order to increase adhesion of the intermediate layer material with the polyurethane that is preferably used in the subsequently described cover material. In addition, following such abrasion treatment, it is preferable to apply a primer (adhesive) to the surface of the intermediate layer or to add an adhesion reinforcing agent to the material.

The specific gravity of the intermediate layer material is generally less than 1.1, preferably between 0.90 and 1.05, and more preferably between 0.93 and 0.99. Outside of this range, the rebound of the overall ball may decrease and so an increased distance may not be achieved, or the durability of the ball to cracking on repeated impact may worsen.

The intermediate layer has a material hardness on the Shore D hardness scale which is preferably at least 61, more preferably at least 62, and even more preferably at least 63. The upper limit is preferably not more than 70, more preferably not more than 68, and even more preferably not more than 66. The sphere obtained by encasing the core with the intermediate layer (referred to below as the "intermediate layer-encased sphere") has a surface hardness on the Shore hardness scale of preferably at least 67, more preferably at least 68, and even more preferably at least 69. The upper limit is preferably not more than 76, more preferably not more than 74, and even more preferably not more than 72. When the intermediate layer-encased sphere is softer than this range, on full shots with a driver (W #1) or an iron, the rebound may be inadequate or the ball may be too receptive to spin, as a result of which a good distance may not be achieved. On the other hand, when the intermediate layer-encased sphere is harder than this range, the durability of the ball to cracking on repeated impact may worsen or the ball may have too hard a feel at impact.

The intermediate layer has a thickness of preferably at least 0.8 mm, more preferably at least 1.0 mm, and even more preferably at least 1.1 mm. The upper limit is preferably not more than 1.7 mm, more preferably not more than 1.5 mm, and even more preferably not more than 1.3 mm. Outside of this range, the spin rate-lowering effect on shots with a driver (W #1) may be inadequate and a good distance may not be achieved.

Next, the cover, which is the outermost layer of the ball, is described.

Various types of thermoplastic resins employed as cover stock in golf balls may be used as the cover material in this invention. For reasons having to do with ball controllability and scuff resistance, it is especially preferable to use a urethane resin material. From the standpoint of mass productivity of the manufactured balls, it is preferable to use as this urethane resin material one that is composed primarily of thermoplastic polyurethane, and especially preferable to use a resin material in which the main components are (A) the thermoplastic polyurethane and (B) the polyisocyanate compound that are described below.

The thermoplastic polyurethane (A) has a structure which includes soft segments composed of a polymeric polyol (polymeric glycol) that is a long-chain polyol, and hard segments composed of a chain extender and a polyisocyanate compound. Here, the long-chain polyol serving as a starting material may be any that has hitherto been used in the art relating to thermoplastic polyurethanes, and is not particularly limited. Illustrative examples include polyester polyols, polyether polyols, polycarbonate polyols, polyester polycarbonate polyols, polyolefin polyols, conjugated diene polymer-based polyols, castor oil-based polyols, silicone-based polyols and vinyl polymer-based polyols. These long-chain polyols may be used singly, or two or more may be used in combination. Of these, in terms of being able to synthesize a thermoplastic polyurethane having a high rebound resilience and excellent low-temperature properties, a polyether polyol is preferred.

Any chain extender that has hitherto been employed in the art relating to thermoplastic polyurethanes may be suitably used as the chain extender. For example, low-molecular-weight compounds with a molecular weight of 400 or less which have on the molecule two or more active hydrogen atoms capable of reacting with isocyanate groups are preferred. Illustrative, non-limiting, examples of the chain extender include 1,4-butylene glycol, 1,2-ethylene glycol, 1,3-butanediol, 1,6-hexanediol and 2,2-dimethyl-1,3-propanediol. Of these, the chain extender is preferably an aliphatic diol having 2 to 12 carbon atoms, and more preferably 1,4-butylene glycol.

Any polyisocyanate compound hitherto employed in the art relating to thermoplastic polyurethanes may be suitably used without particular limitation as the polyisocyanate compound (B). For example, use may be made of one, two or more selected from the group consisting of 4,4'-diphenylmethane diisocyanate, 2,4-toluene diisocyanate, 2,6-toluene diisocyanate, p-phenylene diisocyanate, xylylene diisocyanate, 1,5-naphthylene diisocyanate, tetramethylxylene diisocyanate, hydrogenated xylylene diisocyanate, dicyclohexylmethane diisocyanate, tetramethylene diisocyanate, hexamethylene diisocyanate, isophorone diisocyanate, norbornene diisocyanate, trimethylhexamethylene diisocyanate and dimer acid diisocyanate. However, depending on the type of isocyanate, the crosslinking reactions during injection molding may be difficult to control. In the practice of the invention, to provide a balance between stability at the time of production and the properties that are manifested, it is most preferable to use the following aromatic diisocyanate: 4,4'-diphenylmethane diisocyanate.

Commercially available products may be used as the thermoplastic polyurethane serving as component (A). Illustrative examples include Pandex T-8295, Pandex T-8290 and Pandex T-8260 (all from DIC Bayer Polymer, Ltd.).

As noted above, the polyisocyanate compound serving as component (B) is preferably 4,4'-diphenylmethane diisocyanate, which is an aromatic diisocyanate.

In order to have a necessary and sufficient amount of unreacted isocyanate groups present within the cover resin material, it is recommended that the combined amount of components (A) and (B) be preferably at least 60 wt %, and more preferably at least 70 wt %, of the cover material.

In addition to above components (A) and (B), a thermoplastic elastomer other than the above thermoplastic polyurethanes may also be included as component (C). By including this component (C) in the above resin blend, the flowability of the resin blend can be further improved and properties required of the golf ball cover material, such as resilience and scuff resistance, can be increased.

The compositional ratio of above components (A), (B) and (C) is not particularly limited. However, to fully and successfully elicit the advantageous effects of the invention, the compositional ratio (A):(B):(C) is preferably in the weight ratio range of from 100:2:50 to 100:50:0, and more preferably from 100:2:50 to 100:30:8.

Where necessary, various additives other than the components making up the above thermoplastic polyurethane may be included in this resin blend. For example, pigments, dispersants, antioxidants, light stabilizers, ultraviolet absorbers and internal mold lubricants may be suitably included. In addition, silicone components may be added for the purpose of modifying properties such as heat resistance, cold resistance, weather resistance, lubricity, mold release properties, water repellency, flame retardance and flexibility.

The cover serving as the outermost layer has a material hardness, expressed on the Shore D scale, of preferably at least 35, and more preferably at least 40. The upper limit is preferably not more than 55, more preferably not more than 53, and even more preferably not more than 50. The surface hardness of the sphere obtained by encasing the intermediate layer-encased sphere with the outer layer (which hardness is also referred to below as the "ball surface hardness"), expressed on the Shore D scale, is preferably at least 40, and more preferably at least 50. The upper limit is preferably not more than 62, more preferably not more than 61, and even more preferably not more than 60. When the cover is softer than the above range, the spin rate on full shots with a driver (W #1) may rise, as a result of which a good distance may not be obtained. On the other hand, when the cover is harder than the above range, the ball may lack spin receptivity in the short game, resulting in a poor controllability, in addition to which the scuff resistance may be poor.

The cover serving as the outermost layer has a thickness which, although not particularly limited, is preferably at least 0.3 mm, and more preferably at least 0.5 mm, but preferably not more than 1.0 mm, and more preferably not more than 0.8 mm. When the cover is thicker than this range, the ball rebound on shots with a driver (W #1) may be insufficient or the spin rate may be too high, as a result of which a good distance may not be obtained. On the other hand, when the cover is thinner than this range, the scuff resistance may worsen or the ball may lack spin receptivity on approach shots, resulting in poor controllability.

It is preferable for the intermediate layer to be thicker than the cover serving as the outermost layer. Specifically, the value obtained by subtracting the cover thickness from the intermediate layer thickness is preferably greater than 0, more preferably at least 0.2 mm, and even more preferably at least 0.3 mm, but preferably not more than 1.4 mm, more preferably not more than 0.9 mm, and even more preferably not more than 0.5 mm. When this value is too large, the feel at impact may be too hard or the ball may lack spin receptivity on approach shots. When this value is too small, the durability to cracking on repeated impact may worsen or the spin rate-lowering effect on full shots may be inadequate, as a result of which the intended distance may not be obtained.

The manufacture of multi-piece solid golf balls in which the above-described core, intermediate layer and cover (outermost layer) are formed as successive layers may be carried out by a customary method such as a known injection molding process. For example, a multi-piece golf ball can be produced by injection-molding an intermediate layer material over the core so as to obtain an intermediate layer-encased sphere, and then injection-molding a cover material over the intermediate layer-encased sphere. Alternatively, the encasing layers may each be formed by enclosing the sphere to be encased within two half-cups that have been pre-molded into hemispherical shapes and then molding under applied heat and pressure.

Deflection of Respective Spheres Under Specific Loading

It is preferable to set the deflections of the inner core layer, the overall core, the sphere obtained by encasing the core with the intermediate layer and the ball, when compressed under a final load of 1,275 N (130 kgf) from an initial load of 98 N (10 kgf) in the respective ranges indicated below.

The inner core layer has a deflection, when compressed under a final load of 1,275 N (130 kgf) from an initial load of 98 N (10 kgf), of preferably at least 4.5 mm, more preferably at least 5.0 mm, and even more preferably at least 5.5 mm. The upper limit is preferably not more than 7.5 mm, more preferably not more than 7.0 mm, and even more preferably not more than 6.5 mm.

The overall core which includes the inner core layer and the outer core layer has a deflection, when compressed under a final load of 1,275 N (130 kgf) from an initial load of 98 N (10 kgf), of preferably at least 2.6 mm, more preferably at least 2.8 mm, and even more preferably at least 3.0 mm. The upper limit is preferably not more than 4.0 mm, more preferably not more than 3.8 mm, and even more preferably not more than 3.6 mm.

The sphere obtained by encasing the core with the intermediate layer (which sphere is sometimes referred to below as the "intermediate layer-encased sphere") has a deflection, when compressed under a final load of 1,275 N (130 kgf) from an initial load of 98 N (10 kgf), of preferably at least 2.3 mm, more preferably at least 2.5 mm, and even more preferably at least 2.7 mm. The upper limit is preferably not more than 3.5 mm, more preferably not more than 3.3 mm, and even more preferably not more than 3.1 mm.

The sphere obtained by encasing the intermediate layer-encased sphere with the cover, i.e., the ball itself, has a deflection, when compressed under a final load of 1,275 N (130 kgf) from an initial load of 98 N (10 kgf), of preferably at least 2.0 mm, more preferably at least 2.2 mm, and even more preferably at least 2.5 mm. The upper limit is preferably not more than 3.2 mm, more preferably not more than 3.0 mm, and even more preferably not more than 2.8 mm.

When the deflections of the respective above spheres are larger than the ranges specified for each sphere, the feel of the ball at impact may be too soft or the durability of the ball on repeated impact may worsen; also, the initial velocity of the ball on full shots may decrease, as a result of which the intended distance may not be achieved. On the other hand, when the deflections are smaller than the above ranges specified for each sphere, the feel of the ball at impact may be too hard or the spin rate on full shots may be too high, as a result of which the intended distance may not be achieved.

Letting the deflection of the inner core layer be 0 (mm), the deflection of the overall core be P (mm), the deflection of the intermediate layer-encased sphere be Q (mm) and the deflection of the overall ball be S (mm), the ratio P/0 has a value which is preferably greater than 0, more preferably at least 0.8, and even more preferably at least 1.0, but preferably not more than 1.5, more preferably not more than 1.4, and even more preferably not more than 1.3. Also, the ratio Q/P has a value which is preferably at least 0.80, more preferably at least 0.83, and even more preferably at least 0.85, but preferably not more than 0.95, more preferably not more than 0.92, and even more preferably not more than 0.90. The ratio S/O has a value which is preferably more than 0, more preferably at least 1.2, and even more preferably at least 1.5, but preferably not more than 2.1, more preferably not more than 1.9, and even more preferably not more than 1.7. When these values are too large, the feel at impact may be too soft and the initial velocity on full shots may be too low, as a result of which the intended distance on shots with a driver (W #1) may not be achieved. On the other hand, when these values are too small, the feel of the ball at impact may be hard and the spin rate on full shots may rise excessively, as a result of which the intended distance on shots with a driver (W #1) may not be achieved.

Moreover, the value 0-S (mm) obtained by subtracting the deflection S for the overall ball from the deflection 0 of the inner core layer is preferably at least 2.5 mm, more preferably at least 2.8 mm, and even more preferably at least 3.0 mm, but preferably not more than 4.5 mm, more preferably not more than 4.2 mm, and even more preferably not more than 4.0 mm. When this value is too small, the spin rate on full shots may rise excessively, as a result of which the intended distance on shots with a driver (W #1) may not be obtained. On the other hand, when this value is too large, the initial velocity on full shots with a driver (W #1) may be too low, as a result of which the intended distance may not be achieved.

Initial Velocities of Respective Spheres

The relationships between the initial velocity of the overall core, the initial velocity of the intermediate layer-encased sphere and the initial velocity of the ball are preferably set within the ranges indicated below. These initial velocities can be measured using an initial velocity measuring apparatus of the same type as the USGA drum rotation-type initial velocity instrument approved by the R&A. The respective spheres to be measured can be temperature-conditioned for at least 3 hours at a temperature of 23.9±1° C. and then tested in a chamber at a room temperature of 23.9±2° C.

Regarding the relationship between the initial velocity of the overall core and the initial velocity of the intermediate layer-encased sphere, the value obtained by subtracting the initial velocity of the core from the initial velocity of the intermediate layer-encased sphere is preferably at least 0.3 m/s, more preferably at least 0.4 m/s, and even more preferably at least 0.5 m/s. The upper limit is preferably not more than 1.1 m/s, and more preferably not more than 0.8 m/s. When this value is too large, the durability to cracking on repeated impact may worsen. On the other hand, when this value is too small, the spin rate on full shots may rise, as a result of which a satisfactory distance may not be achieved.

Regarding the relationship between the initial velocity of the overall core and the initial velocity of the ball, the value obtained by subtracting the initial velocity of the ball from the initial velocity of the overall core is preferably at least −0.2 m/s, more preferably at least −0.1 m/s, and even more preferably at least 0 m/s, but preferably not more than 0.5 m/s, more preferably not more than 0.4 m/s, and even more preferably not more than 0.2 m/s. When this value is too large, the initial velocity of the ball when struck becomes low, as a result of which a satisfactory distance may not be achieved. On the other hand, when this value is too small, the spin rate on full shots may rise, as a result of which a satisfactory distance may not be achieved.

Regarding the relationship between the initial velocity of the intermediate layer-encased sphere and the initial velocity of the ball, the value obtained by subtracting the initial velocity of the ball from the initial velocity of the intermediate layer-encased sphere is preferably at least 0.5 m/s, more preferably at least 0.6 m/s, and even more preferably at least 0.7 m/s, but preferably not more than 1.1 m/s, and more preferably not more than 0.9 m/s. When this value is too large, the durability to cracking on repeated impact may worsen. On the other hand, when this value is too small, the spin rate on full shots ends up increasing, as a result of which a satisfactory distance may not be achieved.

Surface Hardnesses of Respective Spheres

The relationship among the surface hardness of the overall core, the surface hardness of the intermediate layer-encased sphere and the surface hardness of the ball are preferably set within the ranges indicated below. These surface hardnesses are values measured on the Shore D hardness scale. That is, they indicate values measured with a type D durometer in general accordance with ASTM D2240-95.

Regarding the relationship between the surface hardness of the overall core and the surface hardness of the intermediate layer-encased sphere, the value obtained by subtracting the surface hardness of the overall core from the surface hardness of the intermediate layer-encased sphere, expressed on the Shore D scale, is preferably at least 2, more preferably at least 4, and even more preferably at least 6, but preferably not more than 14, more preferably not more than 12, and even more preferably not more than 10. When this hardness value falls outside of the above range, the ball spin rate-lowering effect on full shots may be inadequate, as a result of which the intended distance may not be achieved, or the durability of the ball to cracking on repeated impact may worsen.

Regarding the relationship between the surface hardness of the overall core and the surface hardness of the ball, the value obtained by subtracting the surface hardness of the ball from the surface hardness of the overall core is preferably at least −3, more preferably at least −1, and even more preferably at least 1, but preferably not more than 10, more preferably not more than 7, and even more preferably not more than 5. When this hardness value falls outside of the above range, the ball spin rate-lowering effect on full shots may be inadequate, as a result of which the intended distance may not be achieved, or the durability of the ball to cracking on repeated impact may worsen.

Regarding the relationship between the surface hardness of the intermediate layer-encased sphere and the surface hardness of the ball, the value obtained by subtracting the surface hardness of the intermediate layer-encased sphere from the surface hardness of the ball is preferably at least −18, more preferably at least −16, and even more preferably at least −12, but preferably not more than −2, more preferably not more than −5, and even more preferably not more than −8. When this value is high (small negative value), the ball may lack spin receptivity on approach shots or the durability to cracking on repeated impact may worsen. On the other hand, when this value is too low (large negative value), the spin rate on full shots may end up rising and the ball initial velocity may become lower, as a result of which the intended distance may not be achieved.

Numerous dimples may be formed on the outer surface of the cover serving as the outermost layer. The number of dimples arranged on the cover surface, although not particularly limited, is preferably at least 250, more preferably at least 300, and even more preferably at least 320, with the upper limit being preferably not more than 380, more preferably not more than 350, and even more preferably not more than 340. When the number of dimples is higher than this range, the ball trajectory may become low, as a result of which the distance traveled by the ball may decrease. On the other hand, when the number of dimples is lower than this range, the ball trajectory may become high, as a result of which a good distance may not be achieved.

The dimple shapes used may be of one type or may be a combination of two or more types suitably selected from among, for example, circular shapes, various polygonal shapes, dewdrop shapes and oval shapes. When circular dimples are used, the dimple diameter may be set to at least about 2.5 mm and up to about 6.5 mm, and the dimple depth may be set to at least 0.08 mm and up to about 0.30 mm.

In order to be able to fully manifest the aerodynamic properties of the dimples, it is desirable for the dimple coverage ratio on the spherical surface of the golf ball, i.e., the dimple surface coverage SR, which is the sum of the individual dimple surface areas, each defined by the flat plane circumscribed by the edge of a dimple, as a percentage of the spherical surface area of the ball were the ball to have no dimples thereon, to be set to from 70% to 90%. Also, to optimize the ball trajectory, it is desirable for the value $V_O$, defined as the spatial volume of the individual dimples below the flat plane circumscribed by the dimple edge, divided by the volume of the cylinder whose base is the flat plane and whose height is the maximum depth of the dimple from the base, to be set to at least 0.35 and not more than 0.80. Moreover, it is preferable for the ratio VR of the sum of the volumes of the individual dimples, each formed below the flat plane circumscribed by the edge of a dimple, with respect to the volume of the ball sphere were the ball surface to have no dimples thereon, to be set to at least 0.6% and not more than 1.0%. Outside of the above ranges in these respective values, the resulting trajectory may not enable a good distance to be obtained and so the ball may fail to travel a fully satisfactory distance.

Figure 2A:
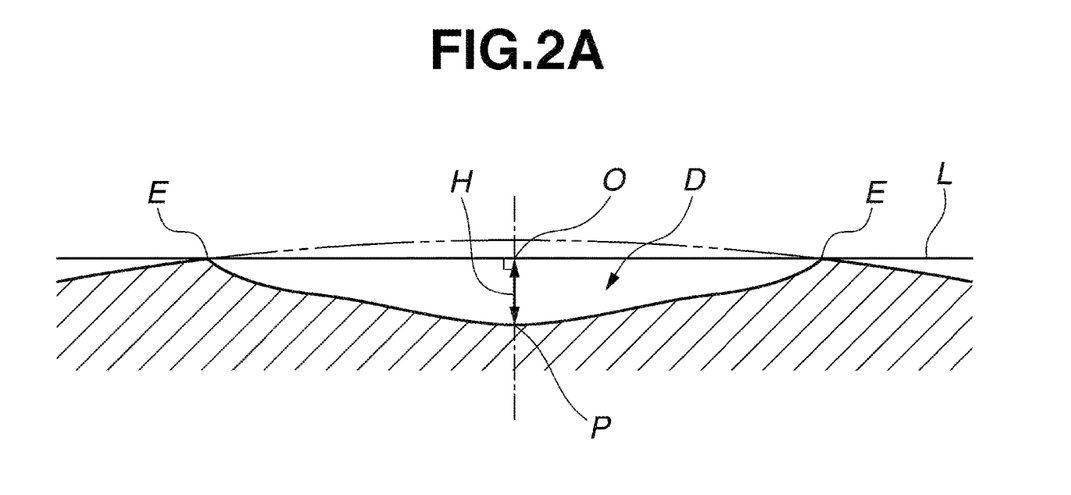

In addition, by optimizing the cross-sectional shape of the dimples, the variability in the flight of the ball can be reduced and the aerodynamic performance improved. Moreover, by holding the percentage change in depth at given positions in the dimples within a fixed range, the dimple effect can be stabilized and the aerodynamic performance improved. The ball has arranged thereon at least one dimple with the cross-sectional shape shown below. A specific example is a dimple having a distinctive cross-sectional shape like that shown in FIG. 2A. FIG. 2A is an enlarged cross-sectional view of a dimple that is circular as seen from above. In this diagram, the symbol D represents a dimple, E represents an edge of the dimple, P represents a deepest point of the dimple, the straight line L is a reference line which passes through the dimple edge E and a center O of the dimple, and the dashed line represents an imaginary spherical surface. The foot of a perpendicular drawn from the deepest point P of the dimple D to an imaginary plane defined by the peripheral edge of the dimple D coincides with the dimple center O. The dimple edge E serves as the boundary between the dimple D and regions (lands) on the ball surface where dimples D are not formed, and corresponds to points where the imaginary spherical surface is tangent to the ball surface (the same applies below). The dimple D shown in FIG. 1 is a circular dimple as seen from above; i.e., in a plan view. The center O of the dimple in the plan view coincides with the deepest point P.

The cross-sectional shape of the dimple D must satisfy the following conditions.

First, as condition (i), let the foot of a perpendicular drawn from a deepest point P of the dimple to an imaginary plane defined by a peripheral edge of the dimple be the dimple center O, and let a straight line that passes through the dimple center O and any one point on the edge E of the dimple be the reference line L.

Next, as condition (ii), divide a segment of the reference line L from the dimple edge E to the dimple center O into at least 100 points. Then compute the distance ratio for each point when the distance from the dimple edge E to the dimple center O is set to 100%. The dimple edge E is the origin, which is the 0% position on the reference line L, and the dimple center O is the 100% position with respect to segment EO on the reference line L.

Next, as condition (iii), compute the dimple depth ratio at every 20% from 0 to 100% of the distance from the dimple edge E to the dimple center O. In this case, the dimple center O is at the deepest part P of the dimple and has a depth H (mm). Letting this be 100% of the depth, the dimple depth ratio at each distance is determined. The dimple depth ratio at the dimple edge E is 0%.

Next, as condition (iv), at the depth ratios in dimple regions 20 to 100% of the distance from the dimple edge E to the dimple center O, determine the change in depth ΔH every 20% of the distance and design a dimple cross-sectional shape such that the change ΔH is at least 6% and not more than 24% in all regions corresponding to from 20 to 100% of the distance.

In this invention, by quantifying the cross-sectional shape of the dimple in this way, that is, by setting the change in dimple depth ΔH to at least 6% and not more than 24%, and thereby optimizing the dimple cross-sectional shape, the flight variability decreases, enhancing the aerodynamic performance of the ball. This change ΔH is preferably from 8 to 22%, and more preferably from 10 to 20%.

Also, to further increase the advantageous effects of the invention, in dimples having the above-specified cross-sectional shape, it is preferable for the change in dimple depth ΔH to reach a maximum at 20% of the distance from the dimple edge E to the dimple center O. Moreover, it is preferable for two or more points of inflection to be included on the curved line describing the cross-sectional shape of the dimple having the above-specified cross-sectional shape.

The multi-piece solid golf ball of the invention can be made to conform to the Rules of Golf for play. Specifically, the inventive ball may be formed to a diameter which is such that the ball does not pass through a ring having an inner diameter of 42.672 mm and is not more than 42.80 mm, and to a weight which is preferably between 45.0 and 45.93 g.

EXAMPLES

The following Examples and Comparative Examples are provided to illustrate the invention, and are not intended to limit the scope thereof.

Examples 1 to 7, Comparative Examples 1 to 7

The inner core layer-forming rubber composition shown in Table 1 below was prepared in the respective Examples, following which it was molded and vulcanized at 155° C. for 13 minutes, thereby producing an inner core layer. Next, one-half of the outer core layer-forming rubber material was charged into an outer core layer mold, sandwiched between the outer core layer mold and a convex mold half of the same radius as the inner core layer and heated at 155° C. for 1 minute, then removed from the mold, thereby producing a half cup-shaped outer core layer. The remaining half of the outer core layer material was similarly formed into a half-cup, and the two half-cups were placed over the molded and vulcanized inner core layer and molded and vulcanized at 155° C. for 13 minutes, thereby producing the overall core (inner core layer+outer core layer). In Comparative Example 5, the core was a single-layer core without an outer core layer. This core was produced by molding and vulcanizing the core material at 155° C. for 15 minutes.

TABLE 1

| | Formulation (pbw) | Working Example | | | | | | | Comparative Example | | | | | | |
|---|---|---|---|---|---|---|---|---|---|---|---|---|---|---|---|
| | | 1 | 2 | 3 | 4 | 5 | 6 | 7 | 1 | 2 | 3 | 4 | 5 | 6 | 7 |
| Inner core layer | Polybutadiene A | 20 | 20 | 20 | 20 | 20 | 20 | 20 | 20 | 20 | 20 | 20 | 80 | 20 | 20 |
| | Polybutadiene B | 80 | 80 | 80 | 80 | 80 | 80 | 80 | 80 | 80 | 80 | 80 | 20 | 80 | 80 |
| | Metal salt of unsaturated carboxylic acid | 20.4 | 17.5 | 20.4 | 20.4 | 20.4 | 17.5 | 20.4 | 31.4 | 25.4 | 5.0 | 5.0 | 27.5 | 17.5 | 20.4 |
| | Organic peroxide (1) | 0.3 | 0.3 | 0.3 | 0.3 | 0.3 | 0.3 | 0.3 | | 0.3 | | | 0.6 | 0.3 | 0.3 |
| | Organic peroxide (2) | 0.3 | 0.3 | 0.3 | 0.3 | 0.3 | 0.3 | 0.3 | 1.2 | 0.3 | 1.2 | 1.2 | 1.2 | 0.3 | 0.3 |
| | Antioxidant | 0.1 | 0.1 | 0.1 | 0.1 | 0.1 | 0.1 | 0.1 | 0.1 | 0.1 | 0.1 | 0.1 | 0.1 | 0.1 | 0.1 |
| | Barium sulfate | 20.5 | 21.8 | 20.5 | 20.5 | 20.5 | 21.8 | 20.5 | 13.8 | 21.1 | 28.7 | 28.7 | 18.2 | 21.8 | 28.9 |
| | Zinc oxide | 4 | 4 | 4 | 4 | 4 | 4 | 4 | 4 | | 4 | 4 | 4 | 4 | 4 |
| | Zinc salt of pentachlorothiophenol | | | | | | | | 0.1 | 0.1 | 0.1 | 0.1 | 0.1 | | |
| Outer core layer | Polybutadiene A | 20 | 20 | 20 | 20 | 20 | 20 | 20 | 20 | 20 | 20 | 20 | | 20 | 20 |
| | Polybutadiene B | 80 | 80 | 80 | 80 | 80 | 80 | 80 | 80 | 80 | 80 | 80 | | 80 | 80 |
| | Metal salt of unsaturated carboxylic acid | 35.6 | 32.5 | 35.6 | 35.6 | 35.6 | 32.5 | 35.6 | 40.3 | 28.3 | 26.5 | 26.5 | | 32.5 | 26.0 |
| | Organic peroxide (2) | 1.2 | 1.2 | 1.2 | 1.2 | 1.2 | 1.2 | 1.2 | 1.2 | 1.2 | 1.2 | 1.2 | | 1.2 | 2.4 |
| | Antioxidant | 0.1 | 0.1 | 0.1 | 0.1 | 0.1 | 0.1 | 0.1 | 0.1 | 0.1 | | | | 0.1 | |
| | Barium sulfate | 13.4 | 14.9 | 13.4 | 13.4 | 13.4 | 14.9 | 13.4 | 9.9 | 16.8 | 19.2 | 19.2 | | 6.1 | 18.3 |
| | Zinc oxide | 4 | 4 | 4 | 4 | 4 | 4 | 4 | 4 | 4 | 4 | 4 | | 4 | 4 |
| | Zinc salt of pentachlorothiophenol | 0.1 | 0.1 | 0.1 | 0.1 | 0.1 | 0.1 | 0.1 | 0.1 | | 0.1 | 0.1 | | 0.1 | 0.1 |

Details on the ingredients in Table 1 are given below.
Polybutadiene A: Available under the trade name "BR 01" from JSR Corporation
Polybutadiene B: Available under the trade name "BR 51" from JSR Corporation
Metal salt of unsaturated carboxylic acid:
　Zinc acrylate (Wako Pure Chemical Industries, Ltd.)
Organic peroxide (1): Dicumyl peroxide, available under the trade name "Percumyl D" from NOF Corporation
Organic peroxide (2): A mixture of 1,1-di(t-butylperoxy) cyclohexane and silica, available under the trade name "Perhexa C-40" from NOF Corporation
Antioxidant: 2,6-Di-t-butyl-4-methylphenol, available under the trade name "Nocrac SP-N" from Ouchi Shinko Chemical Industry Co., Ltd.
Barium sulfate: Precipitated Barium Sulfate #300, from Sakai Chemical Co., Ltd.
Zinc oxide: Available as "Zinc Oxide Grade 3" from Sakai Chemical Co., Ltd.
Zinc salt of pentachlorothiophenol:
　Available from Wako Pure Chemical Industries, Ltd.
　Formation of Intermediate Layer and Cover
Next, using resin materials No. 1 to No. 5 formulated as shown in Table 2 below, an intermediate layer and a cover were successively injection-molded over the core obtained above, thereby producing golf balls in the respective Examples. Dimples were formed on the surface of the ball cover in each Working Example and Comparative Example at this time. The dimples are subsequently described. In Comparative Example 6, an intermediate layer was not formed; only a cover was formed.

TABLE 2

| Intermediate layer and cover formulations (pbw) | No. 1 | No. 2 | No. 3 | No. 4 | No. 5 |
|---|---|---|---|---|---|
| AM7318 | | | 70 | | |
| AM7329 | | | 15 | | |
| Himilan 1706 | | 35 | 15 | | |
| Himilan 1557 | | 15 | | | |
| Himilan 1605 | | 50 | | | |
| T-8290 | 75 | | | | 37.5 |
| T-8283 | 25 | | | 100 | 62.5 |
| Hytrel 4001 | 11 | | | | 11 |
| Silicone wax | 0.6 | | | 0.5 | 0.6 |
| Polyethylene wax | 1.2 | | | 1.0 | 1.2 |
| Isocyanate compound | 7.5 | | | 6.3 | 7.5 |
| Titanium oxide | 3.9 | | | 3.3 | 3.9 |
| Trimethylolpropane | | 1.1 | 1.1 | | |

Trade names of the main materials in the table are as follows.
AM7318, AM7329, Himilan 1706, Himilan 1557 and Himilan 1605:
　Ionomers available from DuPont-Mitsui Polychemicals Co., Ltd.
T-8290, T-8283: MDI-PTMG type thermoplastic polyurethanes available under the trade name Pandex from DIC Covestro Polymer, Ltd.
Hytrel® 4001: A polyester elastomer available from DuPont-Toray Co., Ltd.
Polyethylene wax: Available under the trade name "Sanwax 161P" from Sanyo Chemical Industries, Ltd.
Isocyanate compound: 4,4-Diphenylmethane diisocyanate
Various properties of the resulting golf balls, including the center hardnesses and surface hardnesses of the inner and outer core layers, the diameters of the inner core layer, overall core, intermediate layer-encased sphere and ball, the thicknesses and material hardness of each layer, and the surface hardness and deformation (deflection) under specific loading of the respective layer-encased spheres were evaluated by the following methods. The results are presented in Tables 5 and 6.

Diameters of Inner Core Layer, Outer Core Layer and Intermediate Layer-Encased Sphere The diameters at five random places on the surface were measured at a temperature of 23.9±1° C. and, using the average of these measurements as the measured value for a single inner core layer, overall core (i.e., inner core layer and outer core layer combined) and intermediate layer-encased sphere, the average diameters for ten test specimens were determined.

Diameter of Ball

The diameters at 15 random dimple-free areas on the surface of a ball were measured at a temperature of 23.9±1° C. and, using the average of these measurements as the measured value for a single ball, the average diameter for ten measured balls was determined.

Deflection of Inner Core Layer, Core (Outer Core Layer-Encased Sphere), Intermediate Layer-Encased Sphere and Ball An inner core layer, overall core, intermediate layer-encased sphere or ball was placed on a hard plate and the amount of deflection when compressed under a final load of 1,275 N (130 kgf) from an initial load of 98 N (10 kgf) was measured. The amount of deflection here refers in each case to the measured value obtained after holding the test specimen isothermally at 23.9° C.

Core Hardness Profile

With regard to the overall core which consists of the inner core layer and the outer core layer and has a spherical surface, the indenter of a durometer was set substantially perpendicular to this spherical surface and the surface hardness of the core on the JIS-C hardness scale was measured in accordance with JIS K6301-1975. The Shore D hardness of the core surface was measured with a type D durometer in accordance with ASTM D2240-95. For the overall core consisting of the inner core layer and the outer core layer, cross-sectional hardnesses at the center of the inner core layer and at given positions in each core were measured by perpendicularly pressing the indenter of a durometer against the region to be measured in the flat cross-sectional plane obtained by hemispherically cutting the inner core layer or the outer core layer that includes the inner core layer. The cross-sectional hardnesses are indicated as JIS-C hardness values.

Material Hardnesses (Shore D Hardnesses) of Intermediate Layer and Cover

The intermediate layer and cover-forming resin materials were molded into sheets having a thickness of 2 mm and left to stand for at least two weeks, following which the Shore D hardnesses were measured in accordance with ASTM D2240-95.

Surface Hardnesses (Shore D Hardnesses) of Intermediate Layer-Encased Sphere and Ball Measurements were taken by pressing the durometer indenter perpendicularly against the surface of the intermediate layer-encased sphere or ball (cover). The surface hardness of the ball (cover) is the measured value obtained at dimple-free places (lands) on the ball surface. The Shore D hardnesses were measured with a type D durometer in accordance with ASTM D2240-95.

Initial Velocities of Core, Intermediate Layer-Encased Sphere and Ball

The initial velocities were measured using an initial velocity measuring apparatus of the same type as the USGA drum rotation-type initial velocity instrument approved by The Royal and Ancient Golf Club of St. Andrews (R&A). The cores, intermediate layer-encased spheres and balls, collectively referred to below as "spherical test specimens," were held isothermally in a 23.9±1° C. environment for at least 3 hours, and then tested in a room temperature (23.9±2° C.) chamber. The spherical test specimens were hit using a 250-pound (113.4 kg) head (striking mass) at an impact velocity of 143.8 ft/s (43.83 m/s). One dozen spherical test specimens were each hit four times. The time taken for the test specimen to traverse a distance of 6.28 ft (1.91 m) was measured and used to compute the initial velocity (m/s). This cycle was carried out over a period of about 15 minutes.

Dimples

Figure 2B:
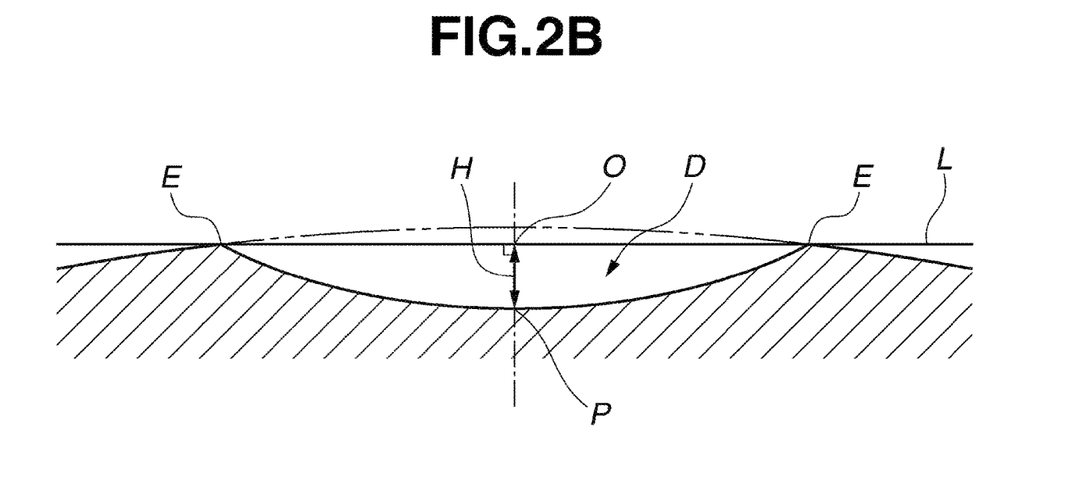

Two families of dimples were used on the ball surface: A and B. Family A includes four types of dimples, details of which are shown in Table 3. The cross-sectional shape of these dimples is shown in FIG. 2A. Family B dimples include four types of dimples, details of which are shown in Table 4. The cross-sectional shape of the latter dimples is shown in FIG. 2B.

In the cross-sectional shapes in FIG. 2, the depth of each dimple from the reference line L to the inside wall of the dimple was determined at 100 equally spaced points on the reference line L from the dimple edge E to the dimple center O. The results are presented in Tables 3 and 4.

Next, the change in depth ΔH every 20% of the distance along the reference line L from the dimple edge E was determined. These values as well are presented in Tables 3 and 4.

TABLE 3

| Family A | | | | | |
|---|---|---|---|---|---|
| Dimple type | | No. 1 | No. 2 | No. 3 | No. 4 |
| Number of dimples | | 240 | 72 | 12 | 14 |
| Diameter (mm) | | 4.3 | 3.8 | 2.8 | 4.0 |
| Depth at point of maximum depth (mm) | | 0.15 | 0.16 | 0.17 | 0.16 |
| Dimple depths at each point (mm) | 20% | 0.06 | 0.07 | 0.07 | 0.07 |
| | 40% | 0.08 | 0.09 | 0.09 | 0.09 |
| | 60% | 0.11 | 0.11 | 0.12 | 0.11 |
| | 80% | 0.13 | 0.14 | 0.15 | 0.14 |
| | 100% | 0.15 | 0.16 | 0.17 | 0.16 |
| Percent change in dimple depth (%) | 0%-20% | 41 | 41 | 41 | 41 |
| | 20%-40% | 15 | 15 | 15 | 15 |
| | 40%-60 | 15 | 15 | 15 | 15 |
| | 60%-80% | 19 | 19 | 19 | 19 |
| | 80%-100% | 10 | 10 | 10 | 10 |
| SR (%) | | 80 | | | |
| VR (%) | | 0.9 | | | |
| Percent of dimples having specified shape (%) | | 100 | | | |

TABLE 4

| Family B | | | | | |
|---|---|---|---|---|---|
| Dimple type | | No. 1 | No. 2 | No. 3 | No. 4 |
| Number of dimples | | 240 | 72 | 12 | 14 |
| Diameter (mm) | | 4.3 | 3.8 | 2.8 | 4.0 |
| Depth at point of maximum depth (mm) | | 0.14 | 0.15 | 0.15 | 0.16 |
| Dimple depths at each point (mm) | 20% | 0.05 | 0.05 | 0.06 | 0.06 |
| | 40% | 0.09 | 0.10 | 0.10 | 0.11 |
| | 60% | 0.12 | 0.13 | 0.13 | 0.13 |
| | 80% | 0.14 | 0.14 | 0.14 | 0.15 |
| | 100% | 0.14 | 0.15 | 0.15 | 0.16 |
| Percent change in dimple depth (%) | 0%-20% | 35 | 37 | 37 | 38 |
| | 20%-40% | 30 | 33 | 31 | 29 |
| | 40%-60% | 21 | 17 | 18 | 17 |
| | 60%-80% | 11 | 10 | 10 | 11 |
| | 80%-100% | 4 | 4 | 3 | 5 |
| SR (%) | | 79 | | | |
| VR (%) | | 0.9 | | | |
| Percent of dimples having specified shape (%) | | 0 | | | |

TABLE 5

| | | Working Example | | | | | | |
|---|---|---|---|---|---|---|---|---|
| | | 1 | 2 | 3 | 4 | 5 | 6 | 7 |
| | Construction | 2-layer core 2-layer cover (4-piece ball) | 2-layer core 2-layer cover (4-piece ball) | 2-layer core 2-layer cover (4-piece ball) | 2-layer core 2-layer cover (4-piece ball) | 2-layer core 2-layer cover (4-piece ball) | 2-layer core 2-layer cover (4-piece ball) | 2-layer core 2-layer cover (4-piece ball) |
| Inner core layer | Material | rubber | rubber | rubber | rubber | rubber | rubber | rubber |
| | Diameter (mm) | 23.4 | 23.4 | 23.4 | 23.4 | 23.4 | 23.4 | 23.4 |
| | Weight (g) | 7.8 | 7.8 | 7.8 | 7.8 | 7.8 | 7.8 | 7.8 |
| | Specific gravity (g/cm³) | 1.163 | 1.163 | 1.163 | 1.163 | 1.163 | 1.163 | 1.163 |
| | Deflection (mm) | 5.7 | 6.3 | 5.7 | 5.7 | 5.7 | 6.3 | 5.7 |
| Hardness profile (JIS-C) | Surface hardness (Cs) | 69 | 64 | 69 | 69 | 69 | 64 | 69 |
| | Hardness at position 10 mm from center (C10) | 70 | 64 | 70 | 70 | 70 | 64 | 70 |
| | Hardness at position 5 mm from center (C5) | 65 | 60 | 65 | 65 | 65 | 60 | 65 |
| | Center hardness (Cc) | 57 | 54 | 57 | 57 | 57 | 54 | 57 |
| | Surface hardness-Center hardness (Cs-Cc) | 12 | 10 | 12 | 12 | 12 | 10 | 12 |

TABLE 5-continued

| | | Working Example | | | | | | |
|---|---|---|---|---|---|---|---|---|
| | | 1 | 2 | 3 | 4 | 5 | 6 | 7 |
| Outer core layer | Surface hardness (Shore D) | 45 | 40 | 45 | 45 | 45 | 40 | 45 |
| | Material | rubber | rubber | rubber | rubber | rubber | rubber | rubber |
| | Thickness (mm) | 7.6 | 7.6 | 7.6 | 7.6 | 7.6 | 7.6 | 7.6 |
| | Specific gravity (g/cm³) | 1.159 | 1.159 | 1.159 | 1.159 | 1.159 | 1.159 | 1.159 |
| Overall core (inner core layer + outer core layer) | Diameter (mm) | 38.7 | 38.7 | 38.7 | 38.7 | 38.7 | 38.7 | 38.7 |
| | Weight (g) | 35.05 | 35.05 | 35.05 | 35.05 | 35.05 | 35.05 | 35.05 |
| | Deflection (mm) | 3.0 | 3.6 | 3.0 | 3.0 | 3.0 | 3.6 | 3.0 |
| | Hardness profile (JIS-C) — Surface hardness (Css) | 92 | 89 | 92 | 92 | 92 | 89 | 92 |
| | Hardness 5 mm inside surface (Css-5) | 77 | 75 | 77 | 77 | 77 | 75 | 77 |
| | Surface hardness-Center hardness (Css-Cc) | 35 | 35 | 35 | 35 | 35 | 35 | 35 |
| | Surface hardness (Shore D) | 62 | 60 | 62 | (32 | 62 | 60 | 62 |
| | Initial velocity (m/s) | 77.3 | 77.2 | 77.3 | 77.3 | 77.3 | 77.3 | 77.3 |
| Intermediate layer | Material | No. 2 | No. 2 | No. 3 | No. 2 | No. 2 | No. 2 | No. 3 |
| | Thickness (mm) | 1.2 | 1.2 | 1.7 | 1.2 | 1.2 | 1.2 | 1.2 |
| | Specific gravity (g/cm³) | 0.94 | 0.94 | 0.94 | 0.94 | 0.94 | 0.94 | 0.94 |
| | Material hardness (Shore D) | 64 | 64 | 66 | 64 | 64 | 64 | 66 |
| Intermediate layer-encased sphere | Diameter (mm) | 41.1 | 41.1 | 41.1 | 41.1 | 41.1 | 41.1 | 41.1 |
| | Weight (g) | 40.7 | 40.7 | 40.7 | 40.7 | 40.7 | 40.7 | 40.7 |
| | Deflection (mm) | 2.7 | 3.1 | 2.6 | 7 1 | 2.7 | 3.1 | 2.6 |
| | Surface hardness (Shore D) | 69 | 69 | 71 | 69 | 69 | 69 | 71 |
| | Initial velocity (m/s) | 77.9 | 77.7 | 78.1 | 77.9 | 77.9 | 78.1 | 78.1 |
| Surface hardness of intermediate layer-Surface hardness of core (Shore D) | | 7 | 9 | 9 | 7 | 7 | 9 | 9 |
| Deflection of overall core-Deflection of intermediate layer-encased sphere (mm) | | 0.3 | 0.5 | 0.4 | 0.3 | 0.3 | 0.5 | 0.4 |
| Cover (outermost layer) | Material | No. 1 | No. 1 | No. 1 | No. 5 | No. 4 | No. 4 | No. 1 |
| | Thickness (mm) | 0.8 | 0.8 | 0.8 | 0.8 | 0.8 | 0.8 | 0.8 |
| | Specific gravity (g/cm³) | 1.15 | 1.15 | 1.0 | 1.15 | 1.15 | 1.15 | 1.15 |
| | Material hardness (Shore D) | 47 | 47 | 47 | 44 | 43 | 43 | 47 |
| Ball | Diameter (mm) | 42.7 | 42.7 | 42.7 | 42.7 | 42.7 | 42.7 | 42.7 |
| | Weight (g) | 45.5 | 45.5 | 45.5 | 45.5 | 45.5 | 45.5 | 45.5 |
| | Deflection (mm) | 2.4 | 2.8 | 7.4 | 2.5 | 2.5 | 2.9 | 2.5 |
| | Surface hardness (Shore D) | 59 | 59 | 60 | 58 | 58 | 58 | 60 |
| | Initial velocity (m/s) | 77.2 | 77.0 | 77.3 | 77.2 | 77.2 | 77.3 | 77.3 |
| | Dimples | Family A | Family A | Family A | Family A | Family A | Family A | Family B |
| Core surface hardness-Ball surface hardness (Shore D) | | 3 | 0 | 2 | 4 | 4 | 2 | 2 |
| Ball surface hardness-Surface hardness of intermediate layer-encased sphere (Shore D) | | −10 | −10 | −11 | −11 | −11 | −11 | −11 |
| Intermediate layer thickness-Cover thickness (mm) | | 0.4 | 0.4 | 0.4 | 0.4 | 0.4 | 0.4 | 0.4 |
| Inner core layer deflection-Ball deflection (mm) | | 3.3 | 3.5 | 3.3 | 3.3 | 3.2 | 3.4 | 3.2 |
| (Deflection of overall core)/(Deflection of inner core layer) | | 0.53 | 0.57 | 0.53 | 0.53 | 0.53 | 0.57 | 0.53 |
| (Deflection of intermediate layer-encased sphere)/(Deflection of overall core) | | 0.89 | 0.86 | 0.87 | 0.89 | 0.89 | 0.86 | 0.87 |
| (Ball deflection)/(Deflection of inner core layer) | | 0.42 | 0.44 | 0.42 | 0.43 | 0.44 | 0.46 | 0.43 |
| (Css)-(Css-5) | | 15 | 14 | 15 | 15 | 15 | 14 | 15 |
| (C10)-(Cc) | | 13 | 10 | 13 | 13 | 13 | 10 | 13 |
| (C5)-(Cc) | | 8 | 6 | 8 | 8 | 8 | 6 | 8 |
| (Css-Css-5)-(C5-Cc) | | 7 | 8 | 7 | 7 | 7 | 8 | 7 |
| (Css-Css-5)-(C10-Cc) | | 2 | 4 | 2 | 2 | 2 | 4 | 2 |
| Initial velocity of intermediate layer-encased sphere-Ball initial velocity (m/s) | | 0.7 | 0.7 | 0.8 | 0.7 | 0.7 | 0.8 | 0.8 |
| Initial velocity of intermediate layer-encased sphere-Core initial velocity (m/s) | | 0.6 | 0.5 | 0.8 | 0.6 | 0.6 | 0.8 | 0.8 |
| Initial velocity of overall core-Ball initial velocity | | 0.1 | 0.2 | 0.0 | 0.1 | 0.1 | 0.0 | 0.0 |

TABLE 6

| | | Comparative Example | | | | | | |
|---|---|---|---|---|---|---|---|---|
| | | 1 | 2 | 3 | 4 | 5 | 6 | 7 |
| | Construction | 2-layer core 2-layer cover (4-piece ball) | 2-layer core 2-layer cover (4-piece ball) | 2-layer core 2-layer cover (4-piece ball) | 2-layer core 2-layer cover (4-piece ball) | 1-layer core 2-layer cover (3-piece ball) | 2-layer core 1-layer cover (3-piece ball) | 2-layer core 2-layer cover (4-piece ball) |
| Inner core layer | Material | rubber | rubber | rubber | rubber | rubber | rubber | rubber |
| | Diameter (mm) | 23.4 | 23.4 | 14.8 | 17.9 | 38.7 | 23.4 | 17.9 |
| | Weight (g) | 7.8 | 7.8 | 2.1 | 3.6 | 35.1 | 7.8 | 3.6 |

TABLE 6-continued

|  |  |  | Comparative Example | | | | | | |
|---|---|---|---|---|---|---|---|---|---|
|  |  |  | 1 | 2 | 3 | 4 | 5 | 6 | 7 |
|  |  | Specific gravity (g/cm³) | 1.163 | 1.163 | 1.211 | 1.203 | 1.160 | 1.163 | 1.203 |
|  |  | Deflection (mm) | 4.0 | 5.8 | 6.0 | 7.3 | 3.0 | 6.3 | 5.7 |
|  | Hardness profile (JIS-C) | Surface hardness (Cs) | 80 | 66 | 38 | 39 | 85 | 64 | 67 |
|  |  | Hardness at position 10 mm from center (C10) | 78 | 65 | 67 | 64 | 72 | 64 | 64 |
|  |  | Hardness at position 5 mm from center (C5) | 67 | 62 | 39 | 34 | 71 | 60 | 64 |
|  |  | Center hardness (Cc) | 59 | 60 | 33 | 32 | 67 | 54 | 57 |
|  |  | Surface hardness-Center hardness (Cs-Cc) | 22 | 6 | 5 | 7 | 18 | 10 | 10 |
|  |  | Surface hardness (Shore D) | 53 | 42 | 21 | 22 | 49 | 40 | 43 |
| Outer core layer |  | Material | rubber | rubber | rubber | rubber |  | rubber | rubber |
|  |  | Thickness (mm) | 7.6 | 7.6 | 11.4 | 9.9 |  | 8.2 | 9.9 |
|  |  | Specific gravity (g/cm³) | 1.159 | 1.159 | 1.163 | 1.162 |  | 1.106 | 1.161 |
| Overall core (inner core layer + outer core layer) |  | Diameter mm) | 38.7 | 38.7 | 37.7 | 37.7 |  | 39.7 | 37.7 |
|  |  | Weight (g) | 35.05 | 35.05 | 32.7 | 32.7 |  | 36.6 | 32.7 |
|  |  | Deflection (mm) | 2.5 | 3.9 | 4.3 | 4.7 |  | 3.5 | 4.2 |
|  | Hardness profile (JIS-C) | Surface hardness (Css) | 88 | 85 | 82 | 82 | 85 | 89 | 84 |
|  |  | Hardness 5 mm inside surface (Css-5) | 75 | 73 | 73 | 72 | 79 | 75 | 72 |
|  |  | Surface hardness-Center hardness (Css-Cc) | 29 | 25 | 49 | 50 | 18 | 35 | 27 |
|  |  | Surface hardness (Shore D) | 59 | 57 | 54 | 54 | 49 | 60 | 56 |
|  |  | Initial velocity (m/s) | 78.0 | 77.5 | 77.2 | 77.0 | 77.3 | 77.2 | 77.2 |
| Intermediate layer |  | Material | No. 2 | No. 2 | No. 2 | No. 2 | No. 2 |  | No. 2 |
|  |  | Thickness (mm) | 1.2 | 1.2 | 1.7 | 1.6 | 20.5 |  | 1.6 |
|  |  | Specific gravity (g/cm³) | 0.94 | 0.94 | 0.95 | 0.96 | 1.12 |  | 0.96 |
|  |  | Material hardness (Shore D) | 64 | 64 | 64 | 64 | 64 |  | 64 |
| Intermediate layer-encased sphere |  | Diameter (mm) | 41.1 | 41.1 | 41.0 | 41.0 | 41.1 |  | 41.0 |
|  |  | Weight (g) | 40.7 | 40.7 | 40.5 | 40.4 | 40.7 |  | 40.4 |
|  |  | Deflection (mm) | 2.2 | 3.3 | 3.4 | 3.4 | 2.7 |  | 3.3 |
|  |  | Surface hardness (Shore D) | 69 | 69 | 69 | 69 | 69 |  | 69 |
|  |  | Initial velocity (m/s) | 78.3 | 77.9 | 77.7 | 77.5 | 77.9 |  | 77.7 |
| Surface hardness of intermediate layer-Surface hardness of core (Shore D) |  |  | 10 | 12 | 15 | 15 | 20 | — | 13 |
| Deflection of overall core-Deflection of intermediate layer-encased sphere (mm) |  |  | 0.4 | 0.6 | 0.9 | 1.2 | −2.7 | — | 0.9 |
| Cover (outermost layer) |  | Material | No. 4 | No. 4 | No. 4 | No. 4 | No. 1 | No. 1 | No. 4 |
|  |  | Thickness (mm) | 0.8 | 0.8 | 0.9 | 0.9 | 0.8 | 1.5 | 0.9 |
|  |  | Specific gravity (g/cm³) | 1.15 | 1.15 | 1.15 | 1.15 | 1.15 | 1.15 | 1.15 |
|  |  | Material hardness (Shore D) | 43 | 43 | 43 | 43 | 47 | 47 | 43 |
| Ball |  | Diameter (mm) | 42.7 | 42.7 | 42.7 | 42.7 | 42.7 | 42.7 | 42.7 |
|  |  | Weight (g) | 45.5 | 45.5 | 45.4 | 45.4 | 45.5 | 45.5 | 45.4 |
|  |  | Deflection (mm) | 2.07 | 3.0 | 3.0 | 3.1 | 2.4 | 3.0 | 2.9 |
|  |  | Surface hardness (Shore D) | 58 | 58 | 58 | 58 | 59 | 53 | 58 |
|  |  | Initial velocity (m/s) | 77.5 | 77.1 | 77.0 | 76.8 | 77.2 | 76.8 | 77.0 |
|  |  | Dimples | Family A | Family A | Family A | Family A | Family A | Family A | Family A |
| Core surface hardness-Ball surface hardness (Shore D) |  |  | 1 | −1 | −4 | −4 | −10 | −13 | −2 |
| Ball surface hardness-Surface hardness of intermediate layer-encased sphere (Shore D) |  |  | −11 | −11 | −11 | −11 | −10 | — | −11 |
| Intermediate layer thickness-Cover thickness (mm) |  |  | 0.4 | 0.4 | 0.8 | 0.8 | 19.7 | — | 0.8 |
| Inner core layer deflection-Ball deflection (mm) |  |  | 1.9 | 2.8 | 3.1 | 4.2 | 0.6 | 3.3 | 2.8 |
| (Deflection of overall core)/(Deflection of inner core layer) |  |  | 0.64 | 0.67 | 0.71 | 0.64 | — | 0.56 | 0.74 |
| (Deflection of intermediate layer-encased sphere)/(Deflection of overall core) |  |  | 0.86 | 0.84 | 0.78 | 0.74 | — | — | 0.79 |
| (Ball deflection)/(Deflection of inner core layer) |  |  | 0.52 | 0.52 | 0.49 | 0.42 | — | 0.48 | 0.51 |
| (Css)-(Css-5) |  |  | 13 | 12 | 10 | 10 | 6 | 14 | 12 |
| (C10)-(Cc) |  |  | 20 | 5 | 34 | 37 | 6 | 10 | 7 |
| (C5)-(Cc) |  |  | 8 | 3 | 6 | 1 | 5 | 6 | 7 |
| (Css-Css-5)-(C5-Cc) |  |  | 5 | 10 | 4 | 9 | 1 | 8 | 5 |
| (Css-Css-5)-(C10-Cc) |  |  | −7 | 7 | −24 | −21 | 0 | 4 | 5 |
| Initial velocity of intermediate layer-encased sphere-Ball initial velocity (m/s) |  |  | 0.8 | 0.8 | 0.7 | 0.7 | 0.7 | — | 0.7 |
| Initial velocity of intermediate layer-encased sphere-Core initial velocity (m/s) |  |  | 0.3 | 0.4 | 0.5 | 0.5 | 0.6 | — | 0.5 |
| Initial velocity of overall core-Ball initial velocity |  |  | 0.4 | 0.5 | 0.2 | 0.2 | 0.1 | 0.4 | 0.2 |

The flight performance (W #1 and I #6) and performance on approach shots of the golf balls obtained in the respective Working Examples and Comparative Examples were evaluated according to the criteria indicated below. The results are shown in Table 7. The measurements were all carried out in a 23° C. environment.

Flight Performance (1)

A driver (W #1) was mounted on a golf swing robot and the distance traveled by the ball when struck at a head speed of 45 m/s was measured and rated according to the criteria shown below. The club used was a TourB XD-3 driver (2016 model; loft angle, 9.5°) manufactured by Bridgestone Sports Co., Ltd. In addition, using an apparatus for measuring the initial conditions, the spin rate was measured immediately after the ball was similarly struck.

Rating Criteria
Excellent (Exc): Total distance was 238 m or more
Good: Total distance was at least 236 m but less than 238 m
Poor (NG): Total distance was less than 236 m Flight Performance (2)

A 6-iron (I #6) was mounted on a golf swing robot and the distance traveled by the ball when struck at a head speed of 40 m/s was measured and rated according to the criteria shown below. The club used was a TourB X-CB, a 6-iron manufactured by Bridgestone Sports Co., Ltd. In addition, using an apparatus for measuring the initial conditions, the spin rate was measured immediately after the ball was similarly struck.

Rating Criteria
Excellent (Exc): Total distance was 170 m or more
Good: Total distance was at least 168 m but less than 170 m
Poor (NG): Total distance was less than 168 m Spin Performance on Approach Shots A sand wedge (SW) was mounted on a golf swing robot and the amount of spin by the ball when struck at a head speed of 20 m/s was rated according to the criteria shown below. The club was the TourB XW-1, a sand wedge manufactured by Bridgestone Sports Co., Ltd. The spin rate was measured using an apparatus for measuring the initial conditions immediately after the ball was struck.

Rating Criteria:
Excellent (Exc): Spin rate was 6,500 rpm or more
Good: Spin rate was at least 6,000 but less than 6,500 rpm
Poor (NG): Spin rate was less than 6,000 rpm As demonstrated by the results in Table 7, the golf balls of Comparative Examples 1 to 7 were inferior in the following respects to the golf balls according to the present invention that were obtained in the Working Examples.

In Comparative Example 1, because the core hardness profile was not as specified in the invention, the spin rates on full shots with a driver (W #1) and an iron were too high, as a result of which the ball did not travel a sufficient distance.

In Comparative Example 2, the (Css)–(Cc) value on the JIS-C scale was not 27 or more, as a result of which the ball did not travel a sufficient distance.

In Comparative Example 3, because the core hardness profile was not as specified in the invention, the spin rates on full shots with a driver (W #1) and an iron were too high, as a result of which the ball did not travel a sufficient distance.

In Comparative Example 4, because the core hardness profile was not as specified in the invention, the spin rates on full shots with a driver (W #1) and an iron were too high, as a result of which the ball did not travel a sufficient distance.

In Comparative Example 5, because the core was made of a single layer and the core hardness profile was not as specified in the invention, the spin rates on full shots with a driver (W #1) and an iron were too high, as a result of which the ball did not travel a sufficient distance.

In Comparative Example 6, the golf ball lacked a hard intermediate layer and the spin rate on full shots with a driver (W #1) was too high, as a result of which the ball did not travel a sufficient distance.

In Comparative Example 7, the inner core layer diameter was less than 21 mm, as a result of which the ball did not travel a sufficient distance on shots with a driver (W #1).

Japanese Patent Application No. 2017-216445 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A multi-piece solid golf ball comprising a two-layer core consisting of an inner core layer and an outer core layer, one or more intermediate layer, and a cover serving as an outermost layer, wherein the inner core layer and the outer core layer are each formed primarily of a base rubber, the inner core layer has a diameter of at least 21 mm, the

TABLE 7

|  |  | Working Example | | | | | | | Comparative Example | | | | | | |
|---|---|---|---|---|---|---|---|---|---|---|---|---|---|---|---|
|  |  | 1 | 2 | 3 | 4 | 5 | 6 | 7 | 1 | 2 | 3 | 4 | 5 | 6 | 7 |
| Flight (W#1) HS, 45 m/s | Spin rate (rpm) | 3,003 | 7,916 | 2,996 | 3,029 | 3,128 | 3,041 | 3,002 | 3,455 | 2,858 | 3,150 | 3,045 | 3,110 | 3,153 | 2,985 |
|  | Total distance (m) | 240.9 | 238.5 | 242.1 | 740.7 | 238.9 | 236.5 | 240.7 | 235.9 | 234.6 | 234.4 | 234.1 | 235.8 | 233.6 | 234.8 |
|  | Rating | Exe | Exc | Exc | Exc | Exc | good | Exc | NG | NG | NG | NG | NG | NG | NG |
| Flight (I#6) | Spin rate (rpm) | 5,276 | 4,650 | 5,121 | 5,374 | 5,875 | 5,249 | 5,131 | 6,726 | 5,148 | 5663 | 5,500 | 5,315 | 5,295 | 4,675 |
|  | Total distance (m) | 169.5 | 175.4 | 171.1 | 168.5 | 168.0 | 172.4 | 170.9 | 161.8 | 171.5 | 167.8 | 170.3 | 168.1 | 168.0 | 172.1 |
|  | Rating | good | Exc | Exc | good | good | Exc | Exc | NG | Exc | NG | good | good | good | Exc |
| Approach shots | Spin rate (rpm) | 6,561 | 6,277 | 6,478 | 6,781 | 6,965 | 6,681 | 6,470 | 7,162 | 6,602 | 6,668 | 6,596 | 6,570 | 6,210 | 6,653 |
|  | Rating | Exc | good | good | Exc | Exc | Exc | good | Exc | Exc | Exc | Exc | Exc | good | Exc | intermediate layer and the cover are each formed primarily of a resin material, and the overall core consisting of the two core layers has a hardness profile that, letting Cc be the JIS-C hardness at a center of the inner core layer, C10 be the JIS-C hardness at a position 10 mm from the center of the inner core layer, Css be the JIS-C hardness at a surface of the outer core layer and Css-5 be the JIS-C hardness at a position 5 mm inside the outer core layer surface, satisfies conditions (1) and (2) below:

{(Css)−(Css-5)}−{(C10)−(Cc)}>0, and  (1)

(Css)−(Cc)≥27, and  (2)

which further satisfies condition (5) below:

initial velocity of ball (m/s)<initial velocity of intermediate layer-encased sphere (m/s)>initial velocity of core (m/s).  (5)

2. The golf ball of claim 1 wherein, letting C5 be the JIS-C hardness at a position 5 mm from the center of the inner core layer, the hardness profile of the overall core further satisfies condition (3) below:

{(Css)−(Css-5)}−{(C5)−(Cc)}≥5.  (3)

3. The golf ball of claim 1 which further satisfies condition (4) below:

cover thickness (mm)<intermediate layer thickness (mm)<outer core layer thickness (mm)<inner core layer diameter (mm).  (4)

4. The golf ball of claim 1 which further satisfies condition (6) below:

(initial velocity of intermediate layer-encased sphere−initial velocity of ball)≥0.5 m/s.  (6)

5. The golf ball of claim 1 which further satisfies condition (7) below:

(initial velocity of intermediate layer-encased sphere−initial velocity of core)≥0.3 m/s.  (7)

6. The golf ball of claim 1 which further satisfies condition (8) below:

−0.2≤(initial velocity of core−initial velocity of ball) ≤0.5 m/s.  (8)

7. The golf ball of claim 1 which, letting E be the deflection (mm) of the inner core layer when compressed under a final load of 1,275 N (130 kgf) from an initial load of 98 N (10 kgf) and C be the deflection (mm) of the overall core when compressed under a final load of 1,275 N (130 kgf) from an initial load of 98 N (10 kgf), satisfies condition (9) below:

0.50≤C/E≤0.75.  (9)

8. The golf ball of claim 1, wherein the outermost layer (cover) has numerous dimples formed on a surface thereof, the ball has arranged thereon at least one dimple with a cross-sectional shape that is described by a curved line or by a combination of a straight line and a curved line and is specified by steps (i) to (iv) below, and the total number of dimples is from 250 to 380:
 (i) letting the foot of a perpendicular drawn from a deepest point of the dimple to an imaginary plane defined by a peripheral edge of the dimple be the dimple center and a straight line that passes through the dimple center and any one point on the edge of the dimple be the reference line;
 (ii) dividing a segment of the reference line from the dimple edge to the dimple center into at least 100 points and computing the distance ratio for each point when the distance from the dimple edge to the dimple center is set to 100%;
 (iii) computing the dimple depth ratio at every 20% from 0 to 100% of the distance from the dimple edge to the dimple center; and
 (iv) at the depth ratios in dimple regions 20 to 100% of the distance from the dimple edge to the dimple center, determining the change in depth ΔH every 20% of said distance and designing a dimple cross-sectional shape such that the change ΔH is at least 6% and not more than 24% in all regions corresponding to from 20 to 100% of said distance.

9. The golf ball of claim 1, wherein, letting C5 be the JIS-C hardness at a position 5 mm from the center of the inner core layer, the hardness profile of the overall core further satisfies conditions (1) and (3) below:

(1) {(Css)−(Css-5)}−{(C10)−(Cc)}>2, and (3) {(Css)−(Css-5)}−{(C5)−(Cc)}≥7.

10. A multi-piece solid golf ball comprising a two-layer core consisting of an inner core layer and an outer core layer, one or more intermediate layer, and a cover serving as an outermost layer, wherein the inner core layer and the outer core layer are each formed primarily of a base rubber, the inner core layer has a diameter of at least 21 mm, the intermediate layer and the cover are each formed primarily of a resin material, and the overall core consisting of the two core layers has a hardness profile that, letting Cc be the JIS-C hardness at a center of the inner core layer, C10 be the JIS-C hardness at a position 10 mm from the center of the inner core layer, Css be the JIS-C hardness at a surface of the outer core layer and Css-5 be the JIS-C hardness at a position 5 mm inside the outer core layer surface, satisfies conditions (1) and (2) below:

{(Css)−(Css-5)}−{(C10)−(Cc)}>0, and  (1)

(Css)−(Cc)≥27; and  (2)

letting E be the deflection (mm) of the inner core layer when compressed under a final load of 1,275 N (130 kgf) from an initial load of 98 N (10 kgf) and C be the deflection (mm) of the overall core when compressed under a final load of 1,275 N (130 kgf) from an initial load of 98 N (10 kgf), satisfies condition (9) below:

0.50≤C/E≤0.75.  (9)

11. The golf ball of claim 10 wherein, letting C5 be the JIS-C hardness at a position 5 mm from the center of the inner core layer, the hardness profile of the overall core further satisfies condition (3) below:

{(Css)−(Css-5)}−{(C5)−(Cc)}≥5.  (3)

12. The golf ball of claim 10 which further satisfies condition (4) below:

cover thickness (mm)<intermediate layer thickness (mm)<outer core layer thickness (mm)<inner core layer diameter (mm).  (4)

13. The golf ball of claim 10 which further satisfies condition (6) below:

(initial velocity of intermediate layer-encased sphere−initial velocity of ball)≥0.5 m/s.  (6)

14. The golf ball of claim 10 which further satisfies condition (7) below:

(initial velocity of intermediate layer-encased sphere−initial velocity of core)≥0.3 m/s.  (7)

15. The golf ball of claim 10 which further satisfies condition (8) below:

$$-0.2 \leq (\text{initial velocity of core} - \text{initial velocity of ball}) \leq 0.5 \text{ m/s}. \quad (8)$$

16. The golf ball of claim 10, wherein the outermost layer (cover) has numerous dimples formed on a surface thereof, the ball has arranged thereon at least one dimple with a cross-sectional shape that is described by a curved line or by a combination of a straight line and a curved line and is specified by steps (i) to (iv) below, and the total number of dimples is from 250 to 380:
  (i) letting the foot of a perpendicular drawn from a deepest point of the dimple to an imaginary plane defined by a peripheral edge of the dimple be the dimple center and a straight line that passes through the dimple center and any one point on the edge of the dimple be the reference line;
  (ii) dividing a segment of the reference line from the dimple edge to the dimple center into at least 100 points and computing the distance ratio for each point when the distance from the dimple edge to the dimple center is set to 100%;
  (iii) computing the dimple depth ratio at every 20% from 0 to 100% of the distance from the dimple edge to the dimple center; and
  (iv) at the depth ratios in dimple regions 20 to 100% of the distance from the dimple edge to the dimple center, determining the change in depth ΔH every 20% of said distance and designing a dimple cross-sectional shape such that the change ΔH is at least 6% and not more than 24% in all regions corresponding to from 20 to 100% of said distance.

17. The golf ball of claim 10, wherein, letting C5 be the JIS-C hardness at a position 5 mm from the center of the inner core layer, the hardness profile of the overall core further satisfies conditions (1) and (3) below:

$$(1) \{(Css)-(Css-5)\}-\{(C10)-(Cc)\} > 2, \text{ and}$$

$$(3) \{(Css)-(Css-5)\}-\{(C5)-(Cc)\} \geq 7.$$

18. A multi-piece solid golf ball comprising a two-layer core consisting of an inner core layer and an outer core layer, one or more intermediate layer, and a cover serving as an outermost layer, wherein the inner core layer and the outer core layer are each formed primarily of a base rubber, the inner core layer has a diameter of at least 21 mm, the intermediate layer and the cover are each formed primarily of a resin material, and the overall core consisting of the two core layers has a hardness profile that, letting Cc be the JIS-C hardness at a center of the inner core layer, C10 be the JIS-C hardness at a position 10 mm from the center of the inner core layer, Css be the JIS-C hardness at a surface of the outer core layer and Css-5 be the JIS-C hardness at a position 5 mm inside the outer core layer surface, satisfies conditions (1) and (2) below:

$$\{(Css)-(Css-5)\}-\{(C10)-(Cc)\} > 0, \quad (1)$$

$$(Css)-(Cc) \geq 27, \text{ and} \quad (2)$$

which further satisfies condition (8) below:

$$-0.2 \leq (\text{initial velocity of core} - \text{initial velocity of ball}) \leq 0.5 \text{ m/s}. \quad (8)$$

19. The golf ball of claim 18 wherein, letting C5 be the JIS-C hardness at a position 5 mm from the center of the inner core layer, the hardness profile of the overall core further satisfies condition (3) below:

$$\{(Css)-(Css-5)\}-\{(C5)-(Cc)\} \geq 5. \quad (3)$$

20. The golf ball of claim 18 which further satisfies condition (4) below:

$$\text{cover thickness (mm)} < \text{intermediate layer thickness (mm)} < \text{outer core layer thickness (mm)} < \text{inner core layer diameter (mm)}. \quad (4)$$

21. The golf ball of claim 18, wherein, letting C5 be the JIS-C hardness at a position 5 mm from the center of the inner core layer, the hardness profile of the overall core further satisfies conditions (1) and (3) below:

$$(1) \{(Css)-(Css-5)\}-\{(C10)-(Cc)\} > 2, \text{ and}$$

$$(3) \{(Css)-(Css-5)\}-\{(C5)-(Cc)\} \geq 7.$$

22. A multi-piece solid golf ball comprising a two-layer core consisting of an inner core layer and an outer core layer, one or more intermediate layer, and a cover serving as an outermost layer, wherein the inner core layer and the outer core layer are each formed primarily of a base rubber, the inner core layer has a diameter of at least 21 mm, the intermediate layer and the cover are each formed primarily of a resin material, and the overall core consisting of the two core layers has a hardness profile that, letting Cc be the JIS-C hardness at a center of the inner core layer, C10 be the JIS-C hardness at a position 10 mm from the center of the inner core layer, Css be the JIS-C hardness at a surface of the outer core layer and Css-5 be the JIS-C hardness at a position 5 mm inside the outer core layer surface, satisfies conditions (1) and (2) below:

$$\{(Css)-(Css-5)\}-\{(C10)-(Cc)\} > 0, \text{ and} \quad (1)$$

$$(Css)-(Cc) \geq 27, \text{ and} \quad (2)$$

wherein the outermost layer (cover) has numerous dimples formed on a surface thereof, the ball has arranged thereon at least one dimple with a cross-sectional shape that is described by a curved line or by a combination of a straight line and a curved line and is specified by steps (i) to (iv) below, and the total number of dimples is from 250 to 380:
  (i) letting the foot of a perpendicular drawn from a deepest point of the dimple to an imaginary plane defined by a peripheral edge of the dimple be the dimple center and a straight line that passes through the dimple center and any one point on the edge of the dimple be the reference line;
  (ii) dividing a segment of the reference line from the dimple edge to the dimple center into at least 100 points and computing the distance ratio for each point when the distance from the dimple edge to the dimple center is set to 100%;
  (iii) computing the dimple depth ratio at every 20% from 0 to 100% of the distance from the dimple edge to the dimple center; and
  (iv) at the depth ratios in dimple regions 20 to 100% of the distance from the dimple edge to the dimple center, determining the change in depth ΔH every 20% of said distance and designing a dimple cross-sectional shape such that the change ΔH is at least 6% and not more than 24% in all regions corresponding to from 20 to 100% of said distance.

* * * * *